(12) United States Patent
Ishida et al.

(10) Patent No.: US 10,536,594 B2
(45) Date of Patent: Jan. 14, 2020

(54) IMAGE FORMING APPARATUS

(71) Applicant: FUJI XEROX CO., LTD., Tokyo (JP)

(72) Inventors: Mitsuyuki Ishida, Yokohama (JP); Yuki Ono, Yokohama (JP); Satoru Kaiya, Yokohama (JP); Hiromasa Kanno, Yokohama (JP); Tatsuya Sato, Yokohama (JP); Osamu Takenouchi, Yokohama (JP); Akio Fukuyama, Yokohama (JP); Bokryong Lee, Yokohama (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 16/411,662

(22) Filed: May 14, 2019

(65) Prior Publication Data

US 2019/0268480 A1 Aug. 29, 2019

Related U.S. Application Data

(63) Continuation of application No. 15/641,684, filed on Jul. 5, 2017, now Pat. No. 10,320,997.

(51) Int. Cl.
*H04N 1/00* (2006.01)

(52) U.S. Cl.
CPC ....... *H04N 1/0049* (2013.01); *H04N 1/00408* (2013.01); *H04N 1/00496* (2013.01); *H04N 1/00559* (2013.01); *H04N 1/00933* (2013.01); *H04N 2201/0082* (2013.01); *H04N 2201/0089* (2013.01)

(58) Field of Classification Search
None
See application file for complete search history.

(56) References Cited

U.S. PATENT DOCUMENTS

| 2003/0049591 | A1* | 3/2003 | Fechter | G09B 19/00 434/307 A |
| 2006/0063591 | A1* | 3/2006 | Gauselmann | G07F 17/3211 463/30 |
| 2010/0091315 | A1* | 4/2010 | Shiraki | G03G 15/5016 358/1.13 |

FOREIGN PATENT DOCUMENTS

| JP | 2005-215563 A | 8/2005 |
| JP | 2006-178362 A | 7/2006 |
| JP | 2010-136840 A | 6/2010 |
| JP | 2012-002968 A | 1/2012 |
| JP | 2016-167220 A | 9/2016 |

* cited by examiner

*Primary Examiner* — Frantz Bataille
(74) *Attorney, Agent, or Firm* — Oliff PLC

(57) ABSTRACT

An image forming apparatus includes: an operation display device that includes an operation display device body, a front light emission portion and a rear light emission portion, the operation display device body including an operation display provided in one face of the operation display device body, the front light emission portion being provided on an upper side of the face of the operation display device body where the operation display is provided, the front light emission portion emitting light in accordance with a processing status, the rear light emission portion being provided on an upper side of an opposite face of the operation display device body to the operation display, the rear light emission portion emitting light in synchronization with the front light emission portion, wherein the operation display device is attached to an upper portion of a body of the image forming apparatus.

7 Claims, 17 Drawing Sheets

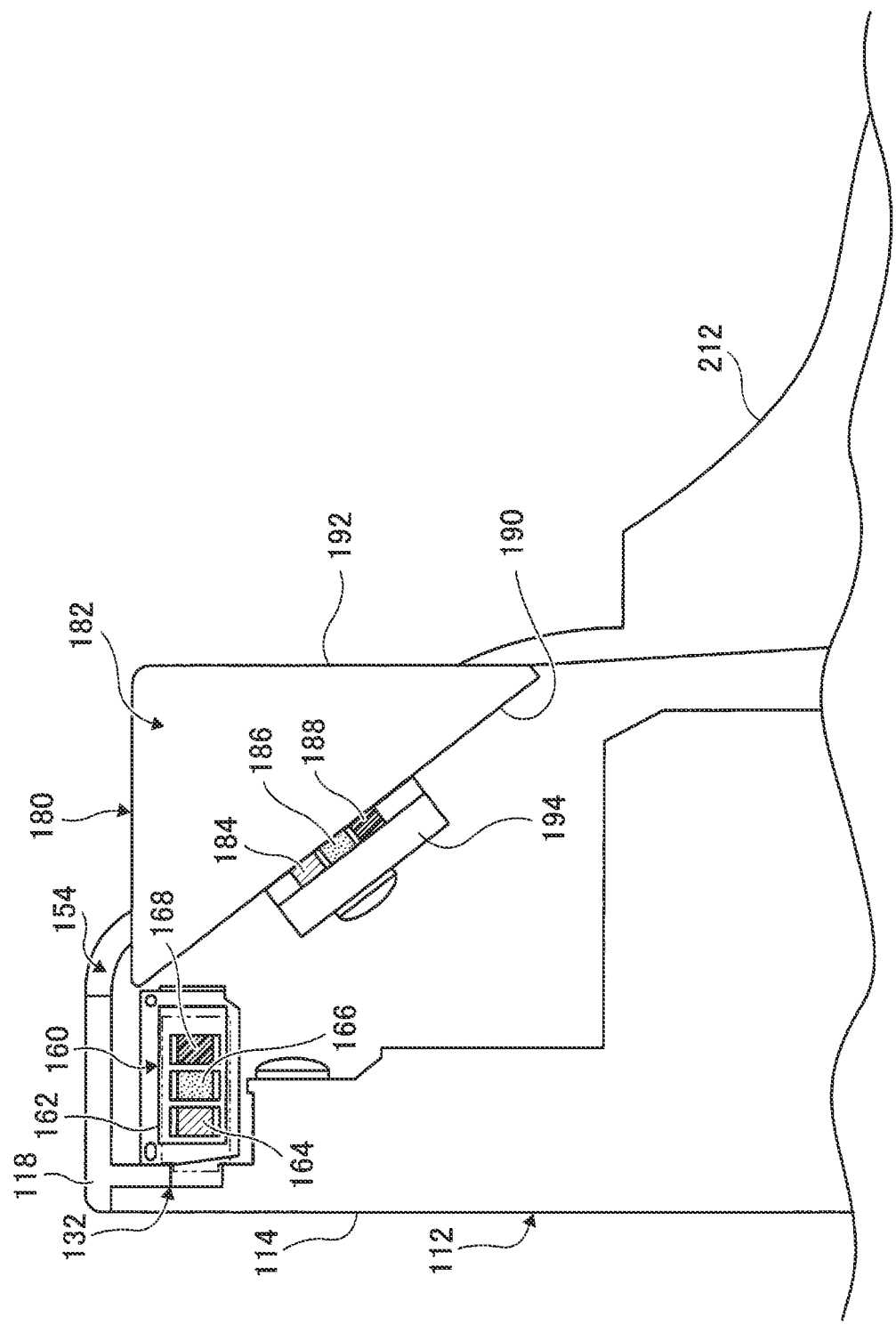

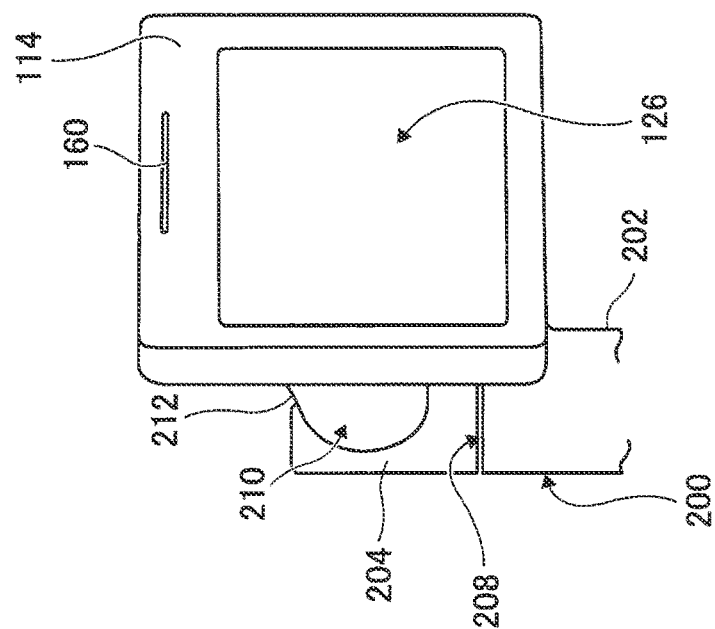
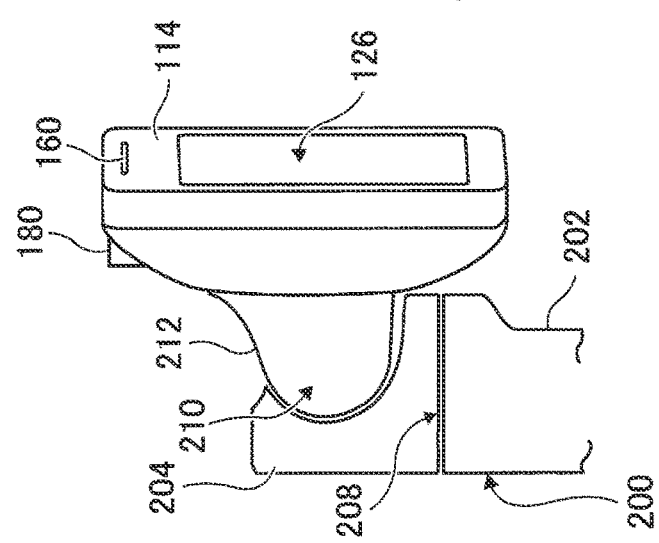
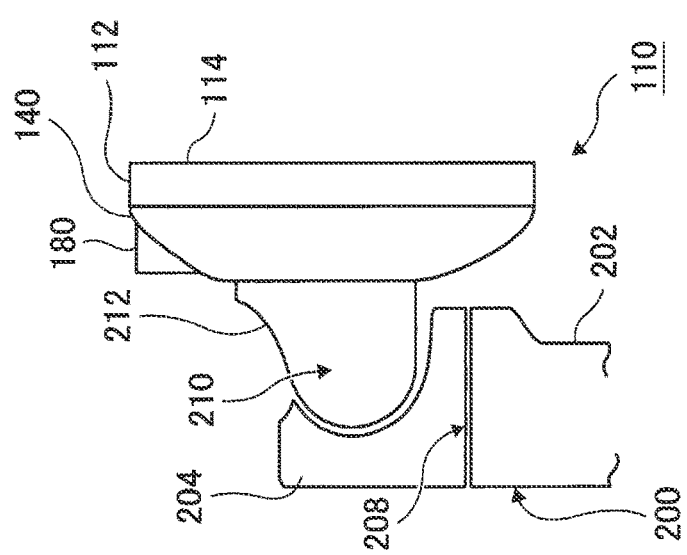

IMAGE FORMING APPARATUS

CROSS-REFERENCE TO RELATED APPLICATIONS

This application is a continuation of U.S. application Ser. No. 15/641,684 filed Jul. 5, 2017, which is based on and claims priority under 35 USC 119 from Japanese Patent Application No. 2017-053366 filed on Mar. 17, 2017 and Japanese Patent Application No. 2017-053367 filed on Mar. 17, 2017.

BACKGROUND

Technical Field

The present invention relates to an image forming apparatus.

SUMMARY

According to an aspect of the invention, there is provided an image forming apparatus including: an operation display device that is provided with an operation display device body, a front light emission portion and a rear light emission portion, the operation display device body including an operation display provided in one face of the operation display device body, the front light emission portion being provided on an upper side of the face of the operation display device body where the operation display is provided, the front light emission portion emitting light in accordance with a processing status, the rear light emission portion being provided on an upper side of an opposite face of the operation display device body to the operation display, the rear light emission portion emitting light in synchronization with the front light emission portion, wherein: the operation display device is attached to an upper portion of an image forming apparatus body.

BRIEF DESCRIPTION OF THE DRAWINGS

Exemplary embodiments of the present invention will be described in detail based on the following figures, wherein:

FIG. 9 is a sectional view showing a front light emission portion and a rear light emission portion;

FIGS. 12A, 12B and 12C are side views showing a state in which the operation display device is rotated toward one side in a right/left direction;

Figure 1:
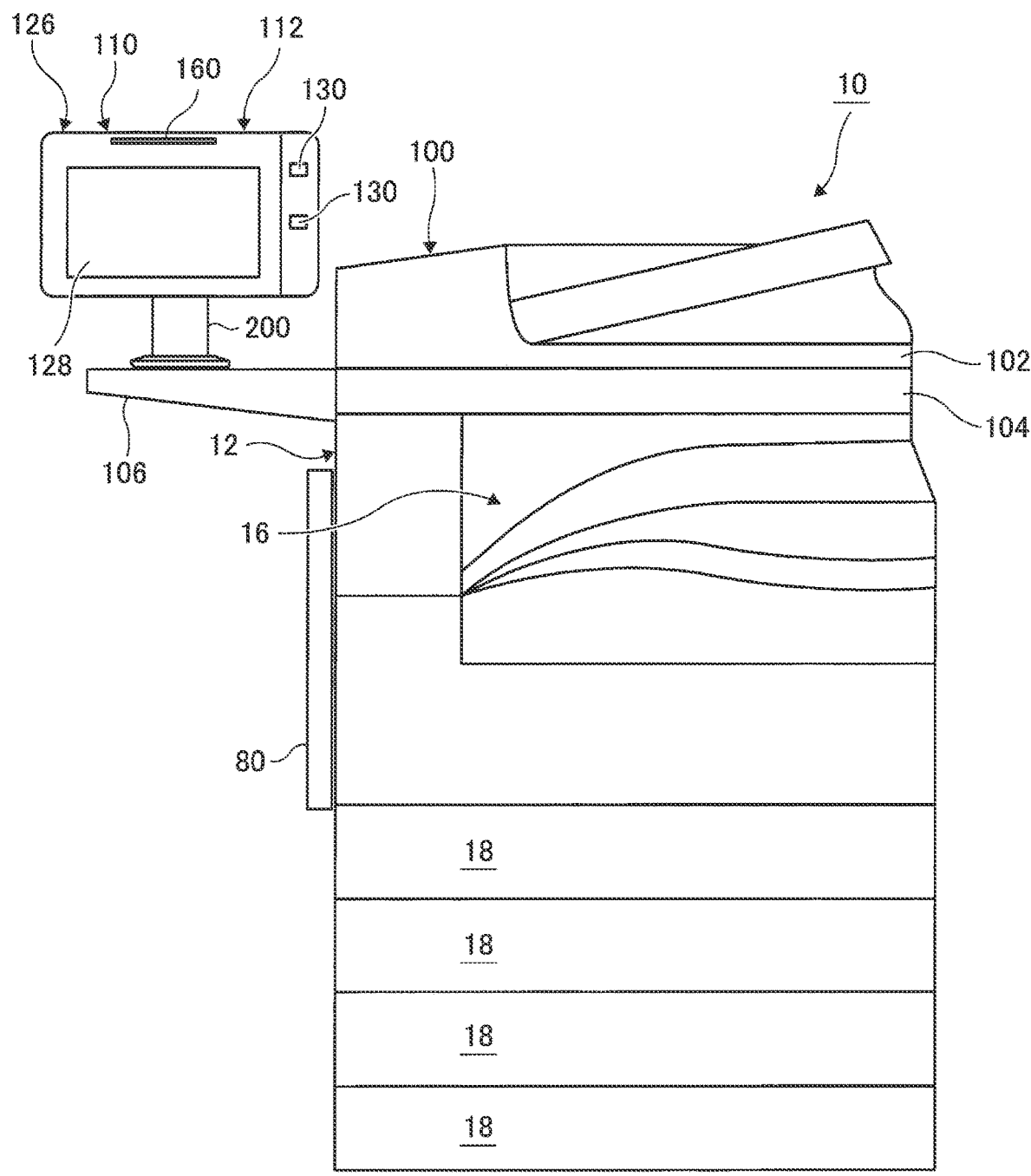
FIG. 1 is an external view showing an image forming apparatus according to an exemplary embodiment, as seen from one side.

REFERENCE SIGNS LIST 10 image forming apparatus
12 image forming apparatus body
100 document reading device
106 mounting stand
110 operation display device
112 operation display device body
114 front face
116 rear face
118 upper face
126 operation display
132 front groove portion
140 (cover member) covering member
144 rear portion
146 upper portion
154 rear groove portion
160 front light emission portion
162 front lens member
164 blue LED
166 green LED
168 orange LED
180 rear light emission portion 182 rear lens member
184 blue LED
186 green LED
188 orange LED
200 columnar member
208 first axis portion
210 second axis portion

DETAILED DESCRIPTION

Exemplary embodiments of the invention will be described below with reference to the drawings. An image forming apparatus for embodying technical ideas of the invention will be shown by way of example in each of the exemplary embodiments which will be described below. There is however no intention to limit the invention to the image forming apparatus. The invention may be equally applied to apparatuses according to other exemplary embodiments which should be included in the scope of Claims.

Exemplary Embodiments

Figure 2:
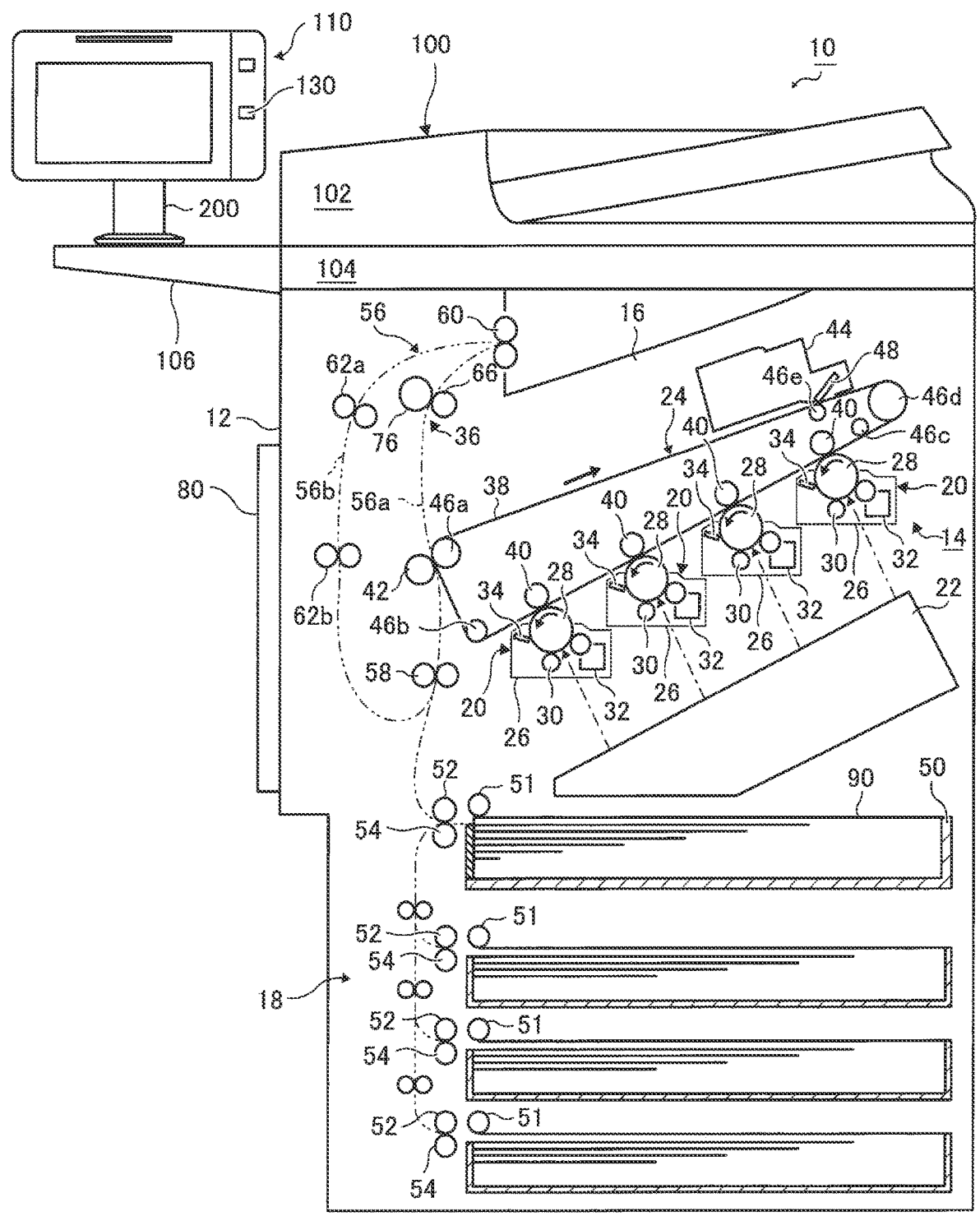
FIG. 2 is a sectional view showing the image forming apparatus according to the exemplary embodiment.
Figure 3:
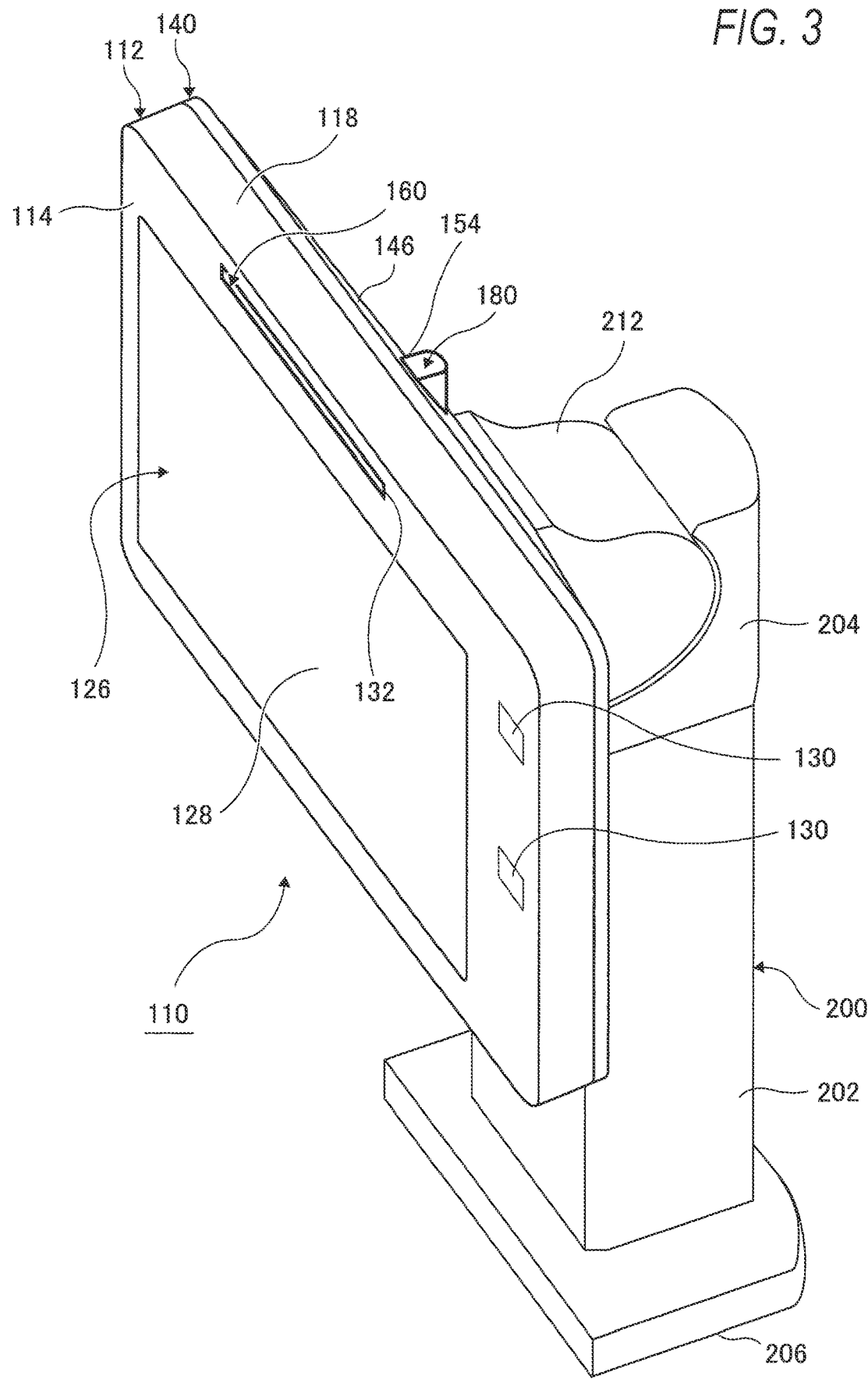
FIG. 3 is a perspective view showing an operation display device according to an exemplary embodiment.

An image forming apparatus 10 according to an exemplary embodiment will be described with reference to FIGS. 1 to 5, FIGS. 6A and 6B, FIG. 7, FIGS. 8A and 8B, FIG. 9, FIGS. 10A and 10B, FIGS. 11A and 11B, FIGS. 12A to 12C, FIGS. 13A to 13C, FIGS. 14A to 14C, FIGS. 15A to 15C, FIGS. 16A to 16C and FIGS. 17A to 17C. As shown in FIGS. 1 and 2, the image forming apparatus 10 according to the exemplary embodiment has an image forming apparatus body 12. In addition, a document reading device 100 and an operation display device 110 are provided on an upper portion side of the image forming apparatus body 12, i.e. on an opposite side to a floor etc. on which the image forming apparatus 10 is disposed. The document reading device 100 reads images etc. The operation display device 110 serves as a user interface (UI) through which various operations or displays can be performed on the image forming apparatus 10. Further, a manual medium feeding unit 80 is provided on a side face (left side in FIG. 2) of the image forming apparatus body 12. The manual medium feeding unit 80 serves as a device which can be opened/closed so that recording media 90 can be placed on the device and sent one by one into the image forming apparatus body 12. Further, recording medium feeding devices 18, an image forming device 14 and a fixation device 36 are mounted inside the image forming apparatus body 12. The recording medium feeding devices 18 feed recording media 90. The image forming device 14 forms images to be transferred to the recording media 90. A discharge portion 16 to which the recording media 90 can be discharged is provided in an upper portion of the image forming apparatus body 12 and on a lower side of the document reading device 100. A conveyance path 56 is provided so that the recording media 90 can be conveyed in the conveyance path 56 to pass through the recording medium feeding devices 18, the image forming device 14, the fixation device 36 and the discharge portion 16.

In addition, the manual medium feeding unit 80 of the image forming apparatus body 12 is configured as follows (see FIG. 1 and FIG. 2). That is, in a state in which the manual medium feeding unit 80 is opened, recording media 90 to be fed from the manual medium feeding unit 80 side into the image forming apparatus body 12 can be placed on the manual medium feeding unit 80 (not shown). In a state in which the manual medium feeding unit 80 is closed, the manual medium feeding unit 80 is received in the side face of the image forming apparatus body 12.

As shown in FIG. 1, the document reading device 100 has a document reading device body 102, and a document conveying device 104. The document conveying device 104 serves as an openable/closable body which has one end supported rotatably on the document reading device body 102 and the other end provided openably/closably. In addition, the document reading device 100 is disposed above the image forming apparatus body 12 so that a space can be provided between the document reading device 100 and the discharge portion 16.

As shown in FIG. 1, the operation display device 110 has an operation display device body 112. An operation display 126 on which operations and displays can be performed is provided on one side of the operation display device body 112. In addition, the operation display device 110 is provided, for example, on a mounting stand 106 having a predetermined area and serving as a mounting portion. The mounting stand 106 protrudes substantially in parallel with the floor and from the top face of the image forming apparatus body 12 where the document reading device 100 is installed. On this occasion, the operation display device 110 is provided in such a manner that an opposite side of the operation display device body 112 to the operation display 126 is connected to a columnar member 200 attached onto the mounting stand 106. In addition, a plurality of light emission portions are provided in the operation display device 110 according to the exemplary embodiment so that predetermined light signals can be emitted from the light emission portions in order to transmit information about a status of the image forming apparatus 10. Incidentally, the place where the operation display device 110 is provided is not limited to the mounting stand 106 having the predetermined area but may be an arm-like mounting arm.

Each of the recording medium feeding devices 18 is provided with a recording medium housing container 50, a pickup roll 51, a conveyance roll 52, and a retard roll 54. Recording media 90 stacked on one another are housed in the recording medium housing container 50. The pickup roll 51 extracts a top one of the recording media 90 housed in the recording medium housing container 50. The conveyance roll 52 conveys the extracted recording medium 90 toward the image forming device 14. The retard roll 54 separates the recording media 90 from one another to prevent a plurality of stacked recording media 90 from being conveyed to the image forming device 14. Incidentally, in the exemplary embodiment, the recording medium feeding devices 18 are provided in a plurality of layers, for example, four layers. Configurations of the recording medium feeding devices 18 are common to one another.

The image forming device 14 is constituted by image forming units 20, for example, corresponding to four colors of yellow (Y), magenta (M), cyan (C) and black (K), an optical writing device 22, and a transfer device 24. Incidentally, the image forming units 20 and constituent elements of the image forming units 20 have the same configurations except colors of images to be formed.

Each of the image forming units 20 is used as an exchangeable member, and provided detachably in the image forming apparatus body 12. The image forming units 20 are arranged side by side sequentially in the order of Y, M, C, and K from a rear side (right side in FIG. 2) of the image forming apparatus body 12.

For example, the image forming units 20 are of an electrophotographic type for forming color images. Each of the image forming units 20 is provided with an image forming unit body 26. A drum-like image retainer 28, a charging device 30, a developing device 32 and a cleaning device 34 are provided inside the image forming unit body 26. The image retainer 28 retains a developing agent image. The charging device 30 serves as a charging unit provided with a charging roll charging the image retainer 28 electrostatically uniformly. The developing device 32 develops a latent image written onto the image retainer 28 by a developing agent (toner). The cleaning device 34 cleans a waste developing agent staying behind on the image retainer 28, for example, by scraping.

The developing device 32 develops the latent image formed on the corresponding image retainer 28 using the developing agent of Y, M, C or K housed in the developing device 32.

In addition, the optical writing device 22 is used as a latent image forming device. For example, the optical writing device 22 includes a scanning type laser exposure device which forms latent images on surfaces of the image retainers 28 respectively. Incidentally, the optical writing device 22 can use an LED, a surface emitting laser, etc. as another Example.

The transfer device 24 is constituted by a member to be transferred 38 used as a transfer body, primary transfer rolls 40 used as primary transfer devices, a secondary transfer roll 42 used as a secondary transfer device, and a cleaning device 44.

The member to be transferred 38 has, for example, an endless belt shape and is supported by five support rolls 46a, 46b, 46c, 46d and 46e to be able to be rotated in a direction indicated by an arrow in FIG. 2. In addition, at least one of the support rolls 46a, 46b, 46c, 46d and 46e is connected to a power source (not shown) such as a motor so as to be rotated by drive transmission received from the power source. By the rotation of the at least one of the support rolls 46a, 46b, 46c, 46d and 46e, the member to be transferred 38 is driven and rotated.

The support roll 46a is disposed to be opposed to the secondary transfer roll 42. The support roll 46a functions as a backup roll of the secondary transfer roll 42. A portion held between the secondary transfer roll 42 and the support roll 46a serves as a secondary transfer position.

The primary transfer rolls 40 transfer, onto the member to be transferred 38, developing agent images which have been formed on the surfaces of the image retainers 28 by the developing devices 32 corresponding to the primary transfer rolls 40 respectively.

In addition, the secondary transfer roll 42 transfers, onto a recording medium 90, the developing agent images of Y, M, C and K which have been transferred to the member to be transferred 38.

The cleaning device 44 has a scraping member 48 for scraping each color developing agent staying behind on the surface of the member to be transferred 38 after the color development agent has been transferred to the recording medium 90 by the secondary transfer roll 42. The developing agent scraped by the scraping member 48 is collected into a body of the cleaning device 44.

The conveyance path 56 is constituted by a main conveyance path 56a and a reverse conveyance path 56b.

The main conveyance path 56a conveys a recording medium 90 fed from one of the recording medium feeding devices 18 or the manual medium feeding unit 80, to the image forming device 14, and discharges the recording medium 90 having an image formed thereon, to the discharge portion 16. In the main conveyance path 56a, the conveyance rolls 52, the retard rolls 54, a register roll 58, the transfer device 24, the fixation device 36 and discharge rolls 60 are disposed sequentially from an upstream side in the conveyance direction of the recording medium 90.

The register roll 58 temporarily stops a front end portion of the recording medium 90 conveyed from the recording medium feeding device 18 side, and sends out the recording medium 90 toward the transfer device 24 so as to agree with an image forming timing.

The fixation device 36 has a heating roll 66 serving as a heating portion, and a pressing portion 76. When the recording medium 90 passing between the heating roll 66 and the pressing portion 76 is heated and pressed, the developing agent images are fixed on the recording medium 90.

The discharge rolls 60 discharge, to the discharge portion 16, the recording medium 90 on which the developing agents have been fixed by the fixation device 36.

In addition, the reverse conveyance path 56 is a conveyance path in which the recording medium 90 having the developing agent images formed on its one surface is turned over and fed toward the image forming device 14 again. For example, two reverse conveyance rolls 62a and 62b are disposed in the reverse conveyance path 56b.

The recording medium 90 is conveyed to the discharge rolls 60 from the main conveyance path 56a. The discharge rolls 60 are reversely rotated in a state in which a rear end portion of the recording medium 90 has been held between the discharge rolls 60. In this manner, the recording medium 90 is fed to the reverse conveyance path 56b. The recording medium 90 fed to the reverse conveyance path 56b is conveyed to an upstream position of the register roll 58 by the reverse conveyance rolls 62a and 62b.

Next, the operation display device 110 according to an exemplary embodiment will be described mainly with reference to FIGS. 3 to 5, FIGS. 6A and 6B, FIG. 7, FIGS. 8A and 8B, FIG. 9, FIGS. 10A and 10B and FIGS. 11A and 11B. The operation display device 110 has the operation display device body 112 having the operation display 126 which is, for example, constituted by a liquid crystal panel, a touch panel, operation buttons etc. A cover member 140 serving as a covering member is provided on an opposite side of the operation display device body 112 to the operation display 126 so that the opposite side of the operation display device body 112 can be covered with the cover member 140. In addition, the operation display device 110 is provided with the columnar member 200 which is connected to the opposite side of the operation display device body 112 to the operation display 126, i.e. the side of the cover member 140. The columnar member 200 has a predetermined length long enough to be placed on the mounting stand 106 provided on the upper portion of the image forming apparatus body 12. The columnar member 200 can be rotated at a predetermined angle. Incidentally, the operation display device 110 which has been attached to the image forming apparatus body 12 is disposed at a highest position in the image forming apparatus 10. Thus, the operation display device 110 is located at a higher position than the document reading device 100 (see FIG. 1).

As shown in FIGS. 3 to 5, FIGS. 6A and 6B, FIG. 7, FIGS. 8A and 8B, FIG. 9, FIGS. 10A and 10B and FIGS. 11A and 11B, the operation display device body 112 has a front face 114, a rear face 116, a bottom face 120, an upper face 118, one side face 122 and the other face 124. The operation display 126 is provided in the front face 114. The cover member 140 is provided on the rear face 116. The bottom face 120 is disposed on the side of the image forming apparatus body 12. The upper face 118 is located on an opposite side to the bottom face 120. The columnar member 200 is connected to the rear face 116 of the operation display device body 112. Incidentally, the operation display 126 according to an exemplary embodiment is provided with a screen 128 of the liquid crystal panel, the touch panel etc., and at least one button 130, e.g. two buttons 130 in the exemplary embodiment.

In addition, in the front face 114 where the operation display 126 is provided in the operation display device body 112, a front light emission portion 160 is provided on the upper face 118 side upper than the screen 128 of the operation display 126. The front light emission portion 160 emits a predetermined light signal in accordance with a processing status of the image forming apparatus 10. For example, the front light emission portion 160 shaped like a rectangle is provided along a longitudinal direction of the upper face 118 between the one side face 122 side and the other side face 124 side. Thus, the front light emission portion 160 is formed into a rectangular shape on the front face 114 side of the operation display device body 112. In this manner, a range in which the front light emission portion 160 can be visually recognized by a user can be widened. Incidentally, the front light emission portion 160 may be provided inside the screen 128.

Figure 10A:
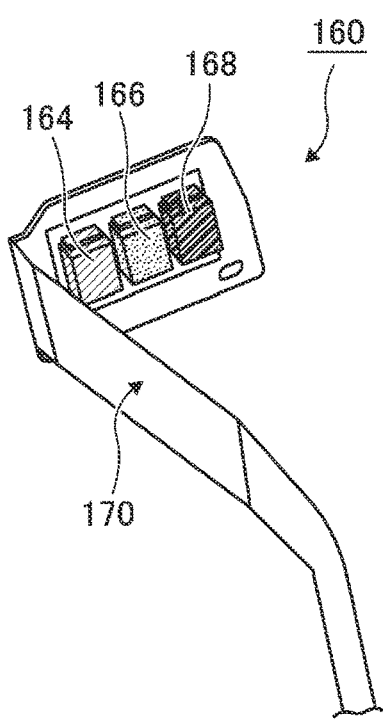
FIG. 10A is a perspective view showing a state in which a front lens member of the front light emission portion has been removed.
Figure 10B:
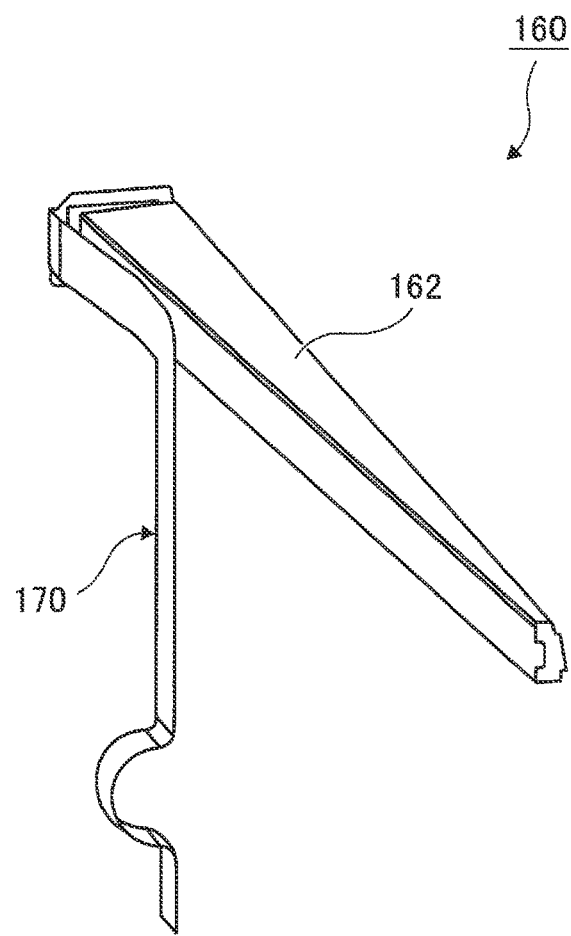
FIG. 10B is a perspective view showing the front light emission portion.

In addition, as shown in FIG. 9 and FIGS. 10A and 10B, for example, the front light emission portion 160 is constituted by three color LEDs (Light Emitting Diodes) as light emitting members. A status of the image forming apparatus 10 is notified according to a color of light emitted from one of the three color LEDs, and identified by the user. Incidentally, three color LEDs, i.e. a blue LED 164, a green LED 166 and an orange LED 168 are used as the LEDs of the front light emission portion 160 according to the exemplary embodiment (hereinafter the blue LED 164, the green LED 166 and the orange LED 168 may be referred to as LEDs 164 to 168 collectively).

The front light emission portion 160 is constituted by the LEDs 164 to 168 and a block-shaped front lens member 162 which are provided inside the operation display device body 112. The front lens member 162 is formed to be fitted into a front groove portion 132 formed on the front face 114 side of the operation display device body 112. The front lens member 162 is attached inside the operation display device body 112 by an attachment member 170.

Light emitted from each of the LEDs 164 to 168 provided inside the operation display device body 112 is transmitted through the front lens member 162. Accordingly, the front lens member 162 emits the light so that the front light emission portion 160 can be visually recognized from the outside of the operation display device 110.

In addition, the front lens member 162 is formed to be narrower as going farther from the side of the LEDs 164 to 168. The front lens member 162 has a shape in which the side disposed on the rear face 116 side of the operation display device body 112 is slanted toward the front face 114.

In addition, the LEDs 164 to 168 of the front light emission portion 160 are provided and arranged side by side in the order of the blue LED 164, the green LED 166 and the orange LED 168 from the front face 114 side of the operation display device body 112 toward the rear face 116 side thereof. Among the three color LEDs, the orange LED 168 has a longest wavelength, the green LED 166 has a second longest wavelength, and the blue LED 164 has a shortest wavelength. Therefore, the blue LED 164 shortest in wavelength is disposed on the side close to the front face 114 from which light is emitted, and the orange LED 168 longest in wavelength is disposed on a side far from the front face 114. In this manner, the LEDs are arranged utilizing the characteristics of their own colors so that uniform light emission can be attained for any of the colors.

In addition, as shown in FIGS. 3 to 5, FIGS. 6A and 6B, FIG. 7, FIGS. 8A and 8B and FIG. 9, the cover member 140 covering the rear face 116 side of the operation display device body 112 is formed into a box-like body which is surrounded by a front portion 142, a rear portion 144, an upper portion 146, a bottom portion 148, one side portion 150 and the other side portion 152. The front portion 142 is opened to be attached to the rear face 116 side of the operation display device body 112 so that the rear face 116 side of the operation display device body 112 can be covered with the cover member 140. The rear portion 144 is located on the opposite side to the front portion 142. A covering portion 212 is formed on the rear portion 144 so that a portion of the columnar member 200 which will be described later can be covered with the covering portion 212. A rear groove portion 154 is formed in the upper portion 146 so that a rear light emission portion 180 which will be described later can be protruded from the rear groove portion 154. The bottom portion 148 is notched partially so that the columnar member 200 can be disposed therein.

In addition, the upper portion 146, the bottom portion 148, the one side portion 150 and the other side portion 152 of the cover member 140 are formed to be slanted from the front portion 142 side toward the rear portion 144. Further, as each face of the upper portion 146, the bottom portion 148, the one side portion 150 and the other side portion 152 is slanted, the slant in a corner portion thereof increases so that the corner portion can be formed into a curved shape.

In addition, the covering portion 212 is formed protrusively on the rear portion 144 of the cover member 140. A portion at which the columnar member 200 is connected to the rear face 116 of the operation display device body 112 is covered with the covering portion 212.

A slanted portion is notched in the upper portion 146 of the cover member 140. Thus, the rear groove portion 154 is formed substantially at a central portion of the upper portion 146 of the cover member 140 so that a rear lens member 182 of the rear light emission portion 180 which will be described later can be protruded from the rear groove portion 154.

In addition, the rear light emission portion 180 is provided on the upper face 118 side of the rear face 116 of the operation display device body 112. The rear light emission portion 180 emits a predetermined light signal in accordance with the processing status of the image forming apparatus 10 in synchronization with the front light emission portion 160. The rear light emission portion 180 is provided to protrude from the rear groove portion 154 formed in the upper portion 146 of the cover member 140.

Figure 11A:
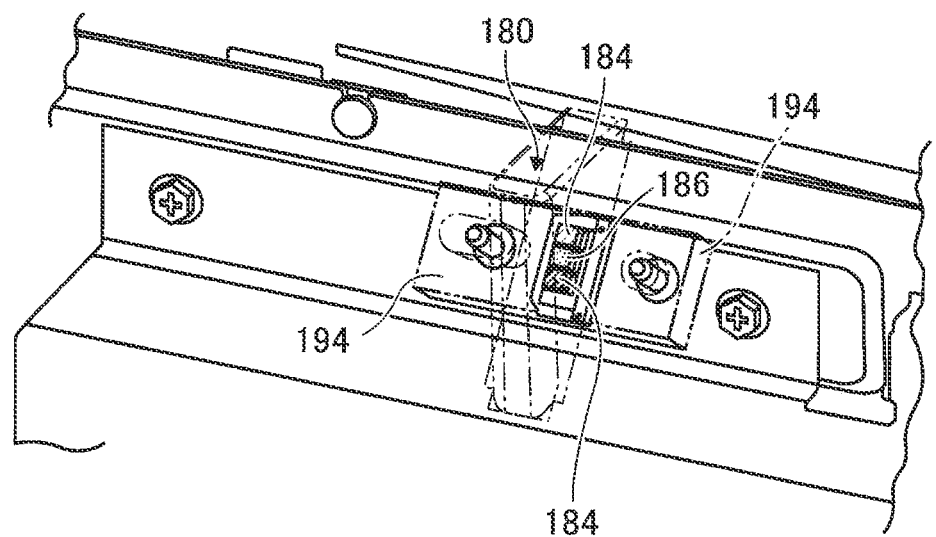
FIG. 11A is a perspective view showing a state in which a rear lens member of the rear light emission portion is indicated transparently.
Figure 11B:
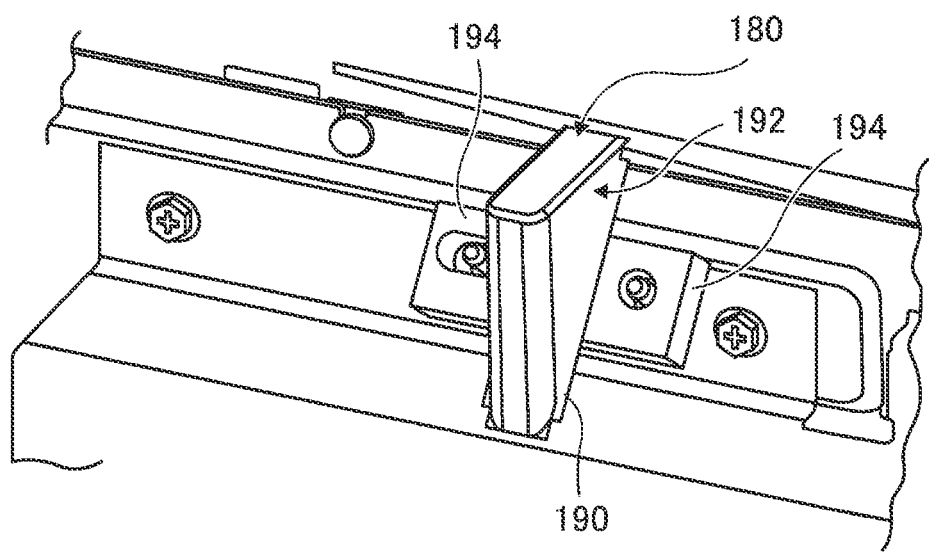
FIG. 11B is a perspective view showing the rear light emission portion.

Incidentally, as shown in FIG. 9 and FIGS. 11A and 11B, for example, the rear light emission portion 180 is constituted by three color LEDs (Light Emitting Diodes) as light emitting members in the same manner as the front light emission portion 160. A status of the image forming apparatus 10 can be notified according to a color of light emitted from one of the LEDs, and identified by the user. In addition, three LEDs, i.e. a blue LED 184, a green LED 186 and an orange LED 188 are likewise used as the LEDs of the rear light emission portion 180 according to an exemplary embodiment in the same manner as the front light emission portion 160 (hereinafter the blue LED 184, the green LED 186 and the orange LED 188 may be referred to as LEDs 184 to 188 collectively).

The rear light emission portion 180 is constituted by the LEDs 184 to 188 and a block-shaped rear lens member 182.

The LEDs 184 to 188 are provided inside the operation display device body 112. The rear lens member 182 is provided on the rear face 116 side of the operation display device body 112 to protrude from the upper portion 146 of the cover member 140.

Light emitted from each of the LEDs 184 to 188 provided inside the operation display device body 112 is transmitted through the rear lens member 182. Accordingly, the rear lens member 182 emits the light so that the rear light emission portion 180 can be visually recognized from the outside of the operation display device 110.

Incidentally, in a state in which the LEDs 184 to 188 of the rear light emission portion 180 are slanted to the rear face 116 side of the operation display device body 112, the three colors of the LEDs 184 to 188 are provided and arranged side by side in a vertical direction, i.e. from the upper face 118 side toward the rear face 116 side.

The rear lens member 182 has a bottom portion 190 and an erect portion 192. The bottom portion 190 is disposed on the side of the LEDs 184 to 188 which are attached in a slanted state to the operation display device body 112. The erect portion 192 shaped substantially like a triangle is provided erectly on the bottom portion 190. A pair of attachment portions 194 attached by screws etc. inside the operation display device body 112 are formed on the bottom portion 190.

The rear lens member 182 attached to the operation display device body 112 protrudes from the rear groove portion 154 of the upper portion 146 of the cover member 140. In this state, the erect portion 192 on the upper face 118 side is substantially parallel with the upper face 118 of the operation display device body 112, while the erect portion 192 on the rear face 116 side is provided substantially at a right angle so as to be substantially parallel with the rear face 116 of the operation display device body 112. That is, the rear lens member 182 of the rear light emission portion 180 is protruded like a triangle from the slanted cover member 140 of the operation display device 110. Incidentally, on this occasion, the erect portion 192 on the upper face 118 side is disposed in a position not going beyond the upper face 118, i.e. in a position lower than the upper face 118.

Figure 7:
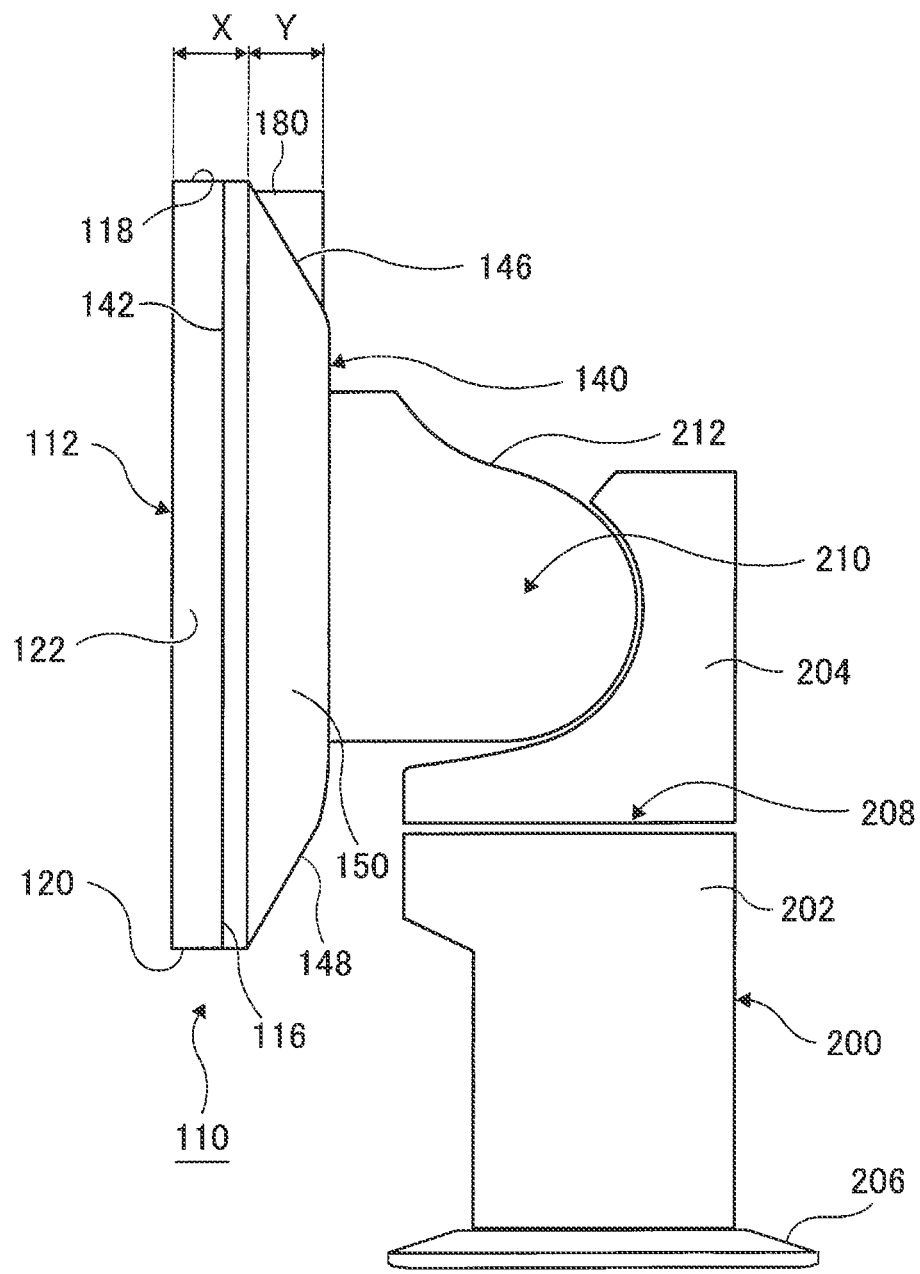
FIG. 7 is a side view showing the operation display device according to the exemplary embodiment, as seen from one side.

In addition, the erect portion 192 of the rear lens member 182 is formed so that a length of the erect portion 192 protruding from the upper portion 146 of the cover member 140 is a length Y which is, for example, about 90% as long as a length X corresponding to a width of the operation display device body 112, specifically, a width between the front face 114 of the operation display device body 112 and the place where the rear lens member 182 protrudes in the upper portion 146 of the cover member 140 (that is, a width between the front face 114 and the rear groove portion 154) (see FIG. 7). That is, when the protruding length of the rear lens member 182 of the rear light emission portion 180 is excessively shorter than the width between the front face 114 of the operation display device body 112 and the rear groove portion 154 from which the rear lens member 182 protrudes in the upper portion 146 of the cover member 140, the rear light emission portion 180 is hidden in the operation display device body 112. Therefore, there is a fear that the rear light emission portion 180 cannot be visually recognized in some position from which the operation display device 110 is seen.

Incidentally, the LEDs 184 to 188 of the rear light emission portion 180 are provided and arranged side by side in the order of the blue LED 184, the green LED 186 and the orange LED 188 from the upper face 118 side of the operation display device body 112 toward the rear face 116 side thereof. Among the three color LEDs, the orange LED 188 has a longest wavelength, the green LED 186 has a second longest wavelength, and the blue LED 184 has a shortest wavelength in the same manner as in the description about the aforementioned front light emission portion 160. Therefore, the LEDs are arranged utilizing the characteristics of their own colors so that uniform light emission can be attained for any of the colors.

In the operation display device 110 according to the exemplary embodiment, the front light emission portion 160 provided on the front face 114 side and the rear light emission portion 180 provided on the rear face 116 side emit light with one of the predetermined colors etc. Thus, the status of the image forming apparatus 10 can be identified. For example, when the image forming apparatus 10 operates normally, the front light emission portion 160 and the rear light emission portion 180 emit green light. When the image forming apparatus 10 transmits/receives various communications, the front light emission portion 160 and the rear light emission portion 180 emit blue light. When an error has occurred in the image forming apparatus 10, the front light emission portion 160 and the rear light emission portion 180 emit orange light.

As shown in FIGS. 3 to 5, FIGS. 6A and 6B, FIG. 7 and FIGS. 8A and 8B, the columnar member 200 is formed into a columnar body having a predetermined length. One side of the columnar member 200 is placed on the mounting stand 106 provided on the image forming apparatus body 12, and the other side of the columnar member 200 is connected to the rear face 116 side of the operation display device body 112.

In addition, the columnar member 200 has a configuration by which the operation display device 110 can be moved with a predetermined angle. The columnar member 200 has a first axis portion 208 around which the operation display device 110 is moved and rotated in a horizontal direction (a left/right direction when the operation display device 110 is viewed from the front, see FIG. 6B), and a second axis portion 210 around which the operation display device 110 is moved and rotated in the vertical direction (an up/down direction when the operation display device 110 is seen from the front, see FIGS. 8A and 8B). Incidentally, the first axis portion 208 is covered with a cover body covering the columnar member 200. On the other hand, the second axis portion 210 is covered with the covering portion 212 of the cover member 140.

The columnar member 200 is separated into a columnar portion 202 on the side of the mounting stand 106 and a movable portion 204 on the side of the operation display device 110 with interposition of the first axis portion 208 therebetween. The columnar portion 202 is placed on the mounting stand 106 and fixed thereto. The movable portion 204 can be rotated relatively to the columnar portion 202. Incidentally, a placement portion 206 placed on the mounting stand 106 is provided on the mounting stand 106 side of the columnar portion 202.

In addition, for example, the first axis portion 208 around which the operation display device 110 is moved can be rotated within a range between about 45° rightward from the front direction and about 45° leftward from the front direction. Thus, the movable portion 204 together with the operation display device 110 can be moved around the first axis portion 208 relatively to the columnar portion 202 (see FIG. 6B).

In addition, a portion at which the moveable portion 204 of the columnar member 200 is connected to the rear face 116 of the operation display device body 112 serves as the second axis portion 210. The second axis portion 210 has an axis in a direction perpendicular to the first axis portion 208.

For example, the second axis portion 210 around which the operation display device 110 is moved can be rotated within a range between about 10° (see FIG. 8A) on the side where the operation display 126 can be rotated to face upward from the front direction, i.e. on the side where the upper face 118 side of the operation display device 110 can be rotated to tilt toward the rear of the rear face 116 side (hereinafter simply referred to as upward), and about 35° (see FIG. 8B) on the side where the operation display 126 can be rotated to face downward from the front side, i.e. on the side where the upper face 118 side of the operation display device 110 can be rotated to tilt toward the front face 114 side (hereinafter simply referred to as downward). Accordingly, the operation display device 110 can be moved relatively to the movable portion 204.

In addition, the rotation of the first axis portion 208 and the rotation of the second axis portion 210 can be used in combination to move the operation display device 110 in the left/right direction and the up/down direction respectively. Thus, the operation display device 110 can be disposed in a position in which the user can use the operation display device 110 easily.

Incidentally, by the front light emission portion 160 provided in the front face 114 of the operation display device body 112 and the rear light emission portion 180 provided in the rear face 116 of the operation display device body 112 in the operation display device 110 according to the exemplary embodiment, the user can identify light emission of the front light emission portion 160 and the rear light emission portion 180 of the operation display device 110 from a wide range of about 360°.

First, visual recognition of the light emission portions 160 and 180 in a case where the operation display device 110 faces the front (does not move in the up/down direction) will be described mainly reference to FIGS. 3 to 5, FIGS. 6A and 6B, FIG. 7, FIGS. 8A and 8B, FIGS. 12A to 12C and FIGS. 13A to 13C.

Figure 4:
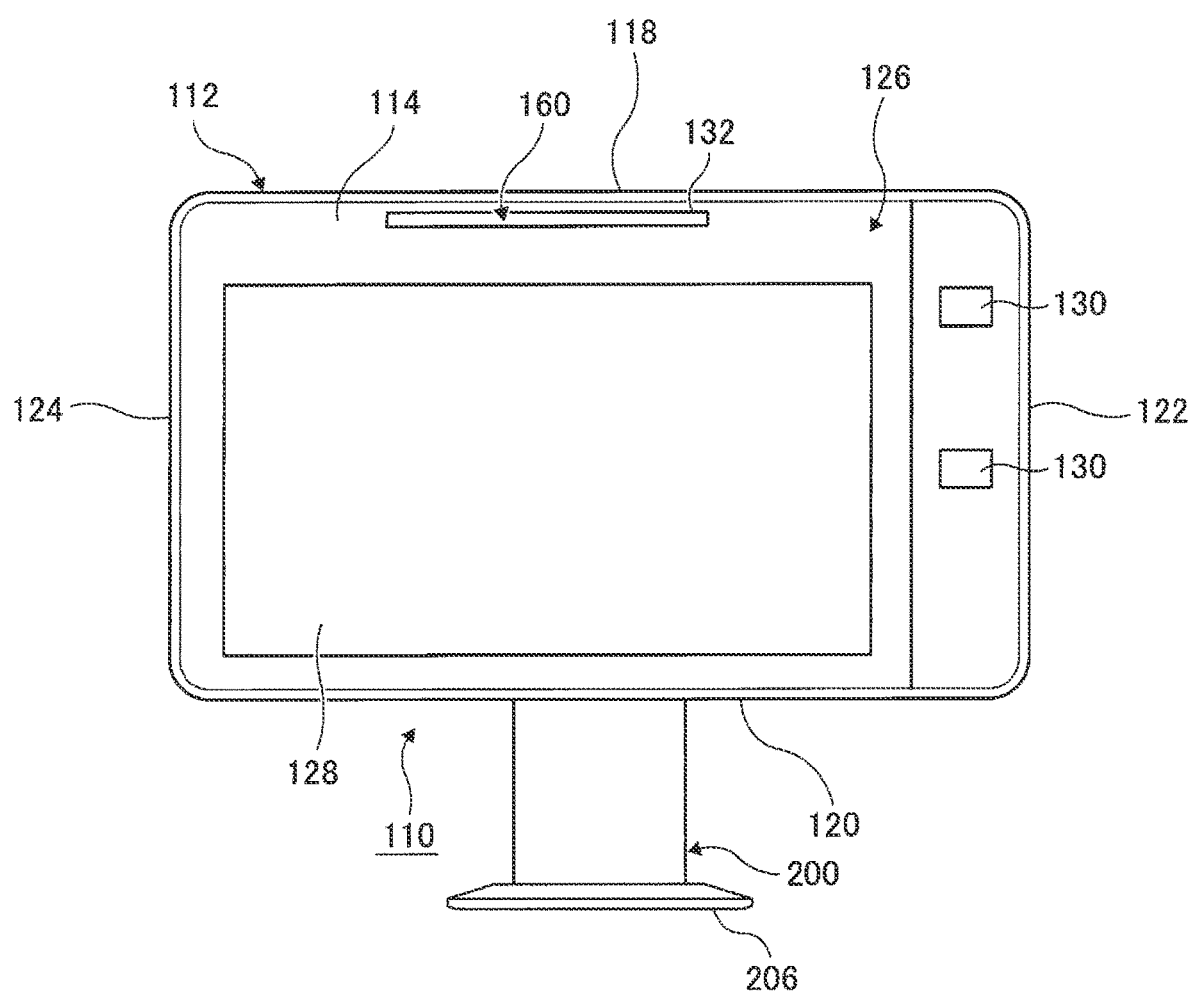
FIG. 4 is a front view showing the operation display device according to the exemplary embodiment.
Figure 5:
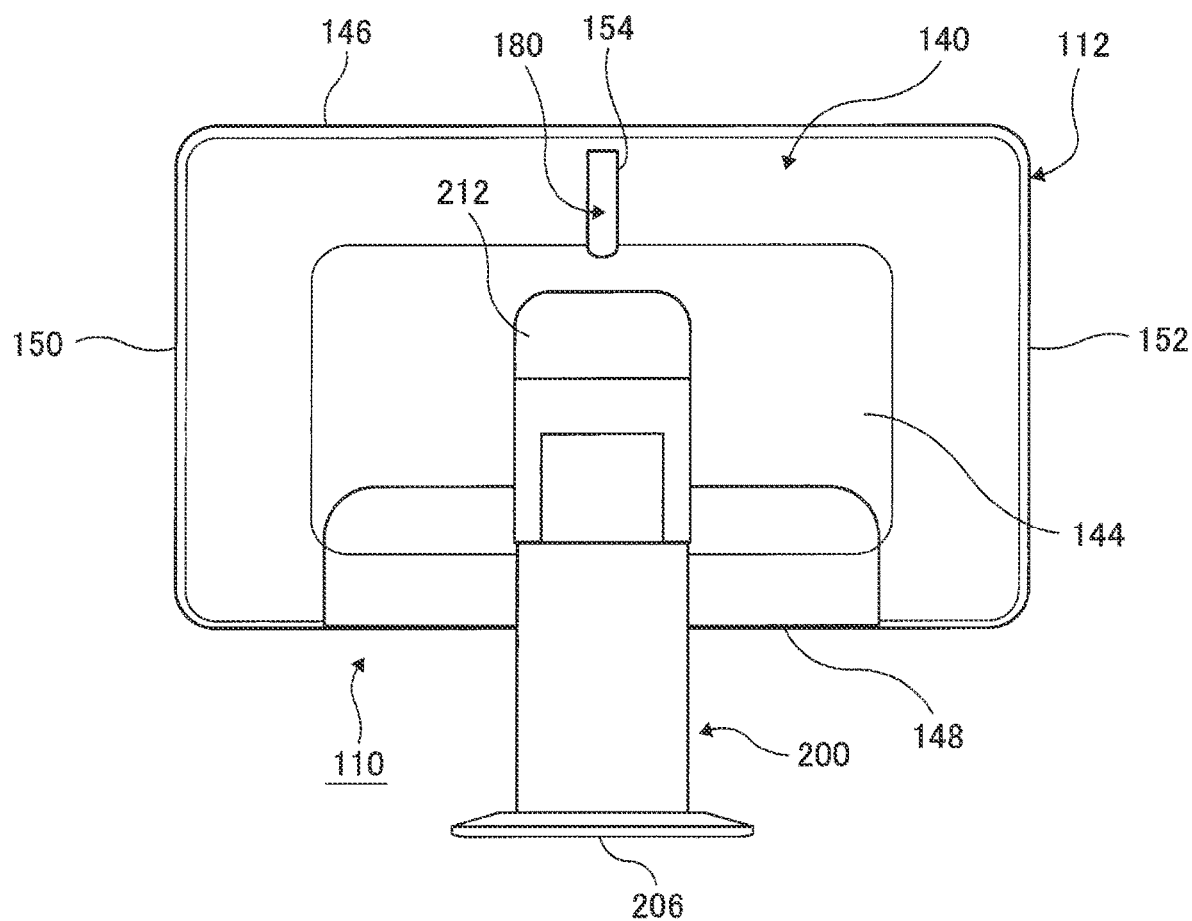
FIG. 5 is a rear view showing the operation display device according to the exemplary embodiment.

In the case where the operation display device 110 faces the front, the user can identify light emission of the front light emission portion 160 from the front face 114 side of the operation display device 110, and can identify light emission of the rear light emission portion 180 from the rear face 116 side, the one side face 122 side and the other side face 124 side of the operation display device 110 (see FIG. 4, FIG. 5 and FIG. 7).

Assume that the user sees the operation display device 110 from a direction oblique to the front face 114, the rear face 116, the one side face 122 and the other side face 124 in the case where the operation display device 110 faces the front. In this case, the user can see one of the front light emission portion 160 and the rear light emission portion 180 of the operation display device 110.

That is, in a state in which the user sees the operation display device 110 from the one side face 122 side, assume that the angle of the operation display device 110 is moved around the first axis portion 208 of the columnar portion 200 so that the operation display device 110 can be gradually rotated in a direction in which the user can see the front face 114, as shown in FIGS. 12A to 12C. In this case, as the operation display device 110 turns the front face 114 side toward the user, the user cannot see the rear light emission portion 180 on the rear face 116 side the user could have seen from the one side face 122 side, but the user can see the front light emission portion 160 on the front face 114 side.

The same thing can be also applied to a case where the user sees the operation display device 110 from the other side face 124 side.

In addition, the rear lens member 182 of the rear light emission portion 180 protrudes with the length Y which is about 90% as long as the length X corresponding to the width between the front face 114 of the operation display device body 112 and the rear groove portion 154 from which the rear lens member 182 protrudes in the upper portion 146 of the cover member 140. Thus, the rear light emission portion 180 can be seen more easily. Incidentally, as long as the user can identify the rear light emission portion 180, the rear lens member 182 of the rear light emission portion 180 may be made shorter than the length which is substantially 90% as long as the width of the operation display device body 112. On the contrary, the rear lens member 182 of the rear light emission portion 180 may be made longer in order to identify the rear light emission portion 180 more easily.

Further, the cover member 140 is provided on the rear face 116 side of the operation display device 110. In the cover member 140, the upper portion 146, the one side portion 150 and the other side portion 152 are formed to be slanted. Thus, the user can see the rear light emission portion 180 easily. At the same time, light is reflected on the cover member 140, for example, on the slant of the upper portion 146 thereof. Thus, the user can identify the rear light emission portion 180 from a wider range.

Figure 13A:
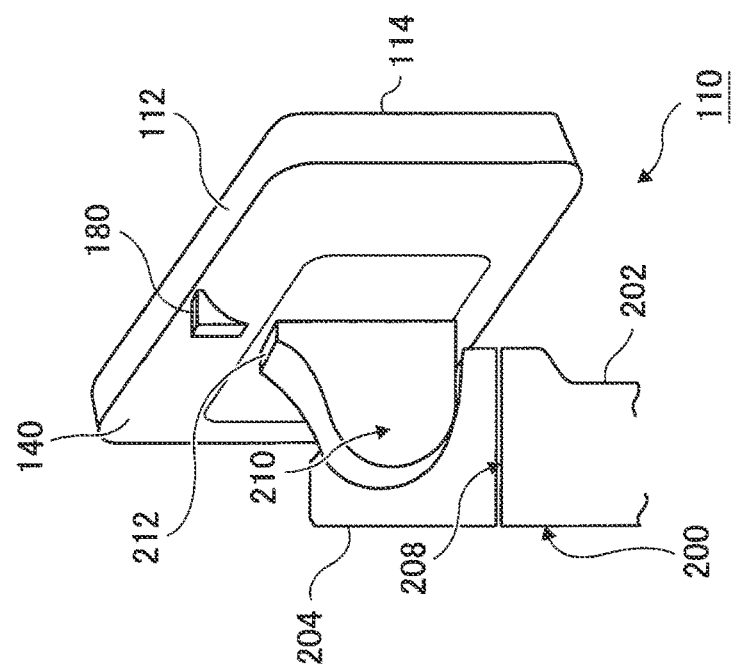
FIGS. 13A, 13B and 13C are side views showing a state in which the operation display device is rotated toward the other side in the right/left direction.
Figure 13B:
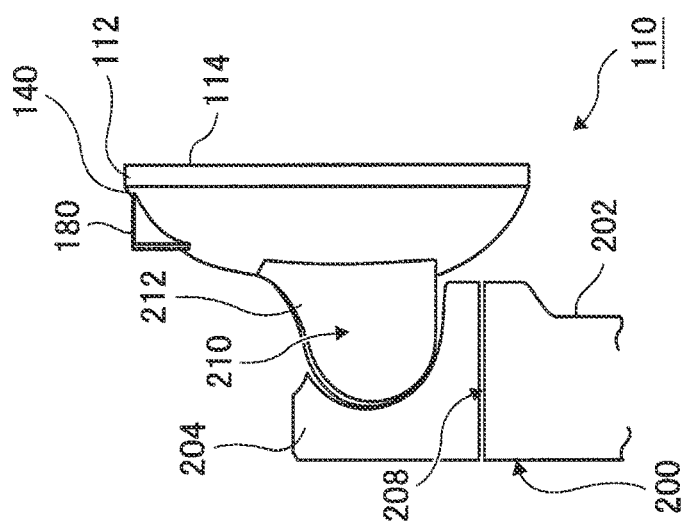
Figure 13C:
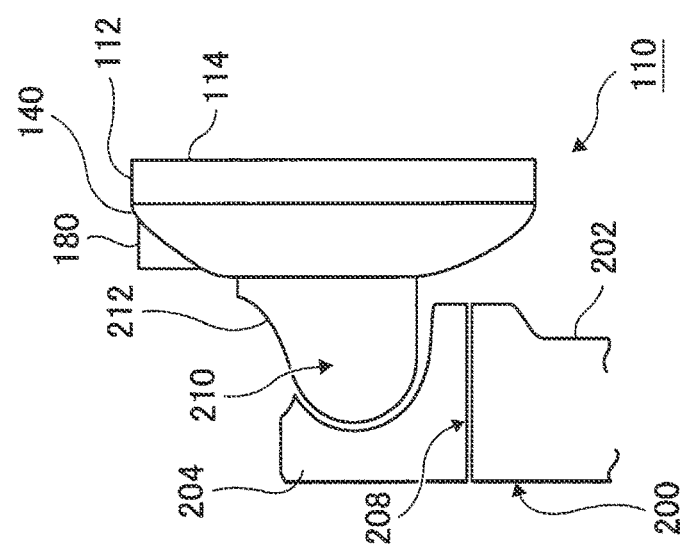

In addition, in a state in which the user sees the operation display device 110 from the one side face 122 side, assume that the angle of the operation display device 110 is moved around the first axis portion 208 of the columnar member 200 so that the operation display device 110 can be gradually rotated in a direction in which the user can see the rear face 116, as shown in FIGS. 13A to 13C. In this case, as the operation display device 110 turns the rear face 116 side toward the user, the user can continuously see the rear light emission portion 180 on the rear face 116 side the user could have seen from the one side face 122 side. Incidentally, the same thing can be also applied to a case where the user sees the operation display device 110 from the other side face 124 side.

Figure 6A:
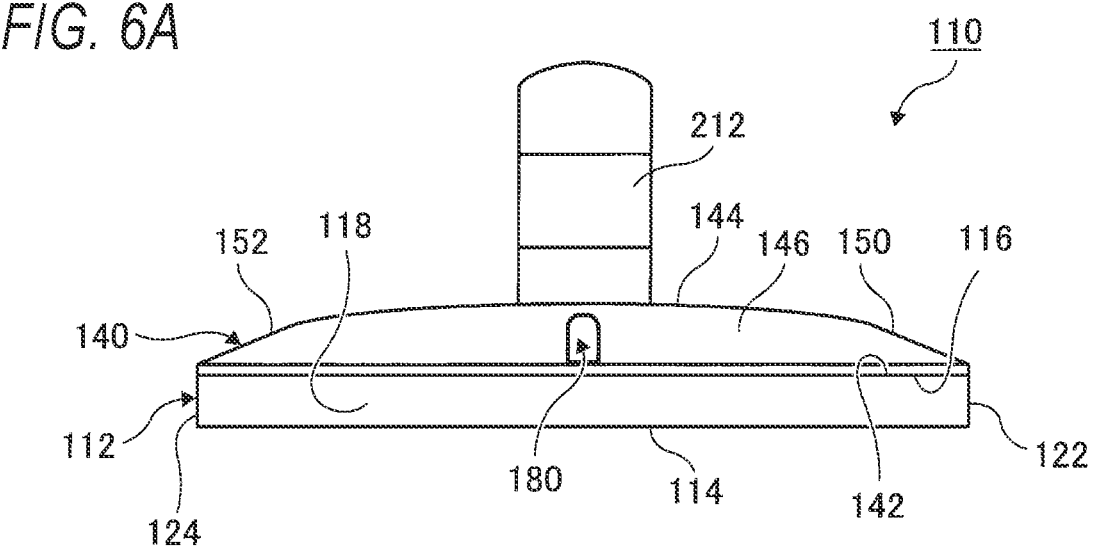
FIG. 6A is a plan view showing the operation display device according to the exemplary embodiment.
Figure 6B:
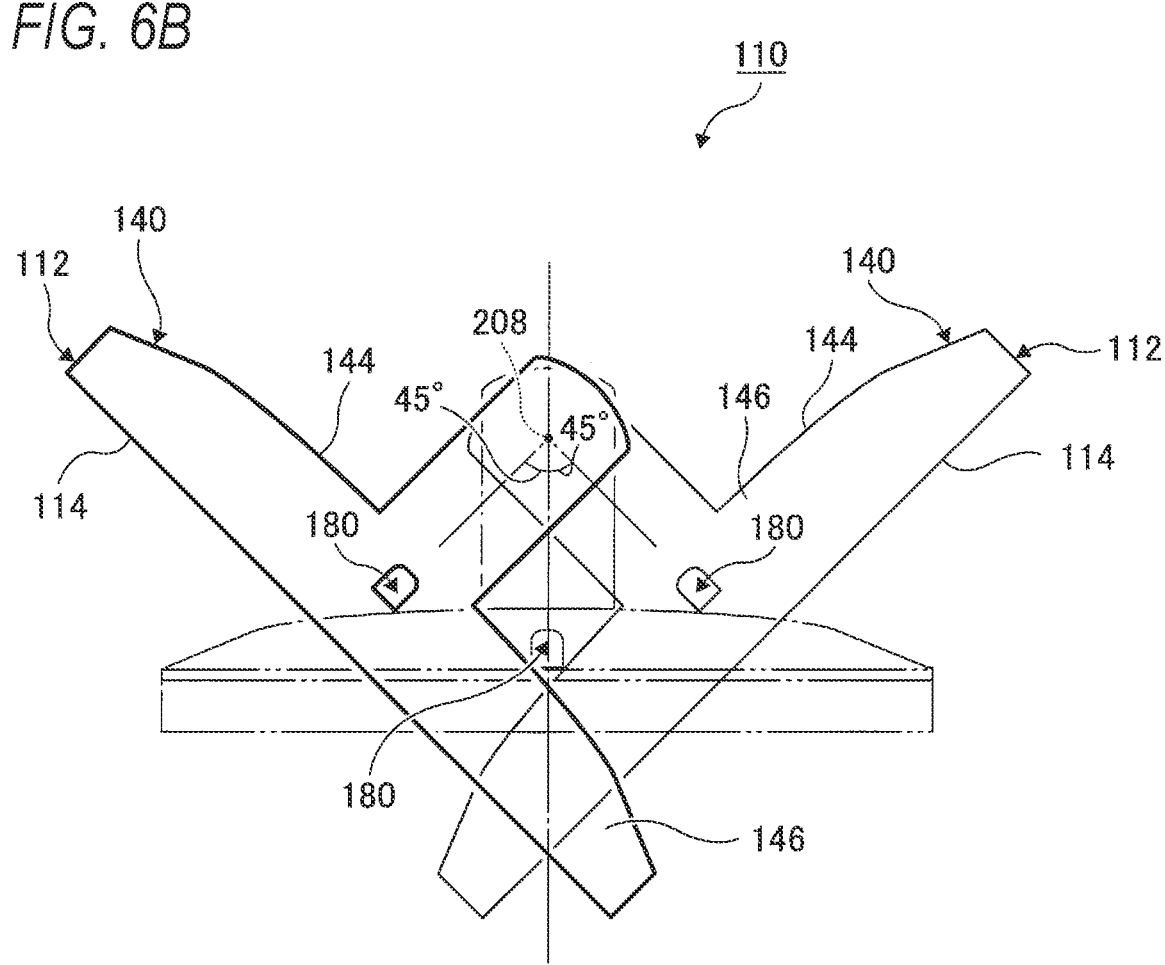
FIG. 6B is a plan view showing a case where the operation display device is rotated in a left/right direction.

When the operation display device 110 is moved within a range of 45° rightward and 45° leftward in a state in which the user sees the operation display device 110 from the front face 114 side, the user can always see the front light emission portion 160 on the front face 114 side (see FIG. 6B). Incidentally, the angle range within which the operation display device 110 can be moved in the left/right direction is set between 45° rightward and 45° leftward in the exemplary embodiment. However, even when the operation display device 110 is moved beyond the set angle range, the user can see the rear light emission portion 180 on the rear face 116 side before or substantially at the same time when the user cannot see the front light emission portion 160 on the front face 114 side.

Similarly, when the operation display device 110 is moved within a range of 45° rightward and 45° leftward in a state in which the user sees the operation display device 110 from the rear face 116 side, the user can always see the rear light emission portion 180 on the rear face 116 side (see FIG. 6B). Incidentally, the angle range within which the operation display device 110 can be moved in the left/right direction is set between 45° rightward and 45° leftward in the exemplary embodiment. However, even when the operation display device 110 is moved beyond the set angle range, the user can see the front light emission portion 160 on the front face 114 side before or substantially at the same time when the user cannot see the rear light emission portion 180 on the rear face 116 side.

In addition, when the angle of the operation display device 110 is moved in the left/right direction as described above, the user can identify the front light emission portion 160 or the rear light emission portion 180 of the operation display device 110 from a wide range. Even when the operation display device 110 is not moved but the position where the user sees the operation display device 110 is changed, the user can see the operation display device 110 from various angles in the same manner as when the operation display device 110 is moved. Also in this case, the user can identify the front light emission portion 160 on the front face 114 side or the rear light emission portion 180 on the rear face 116 side in the same manner as in the case where the angle of the operation display device 110 is moved.

Next, visual recognition of each of the light emission portions 160 and 180 in a case where the operation display device 110 is moved in the up/down direction will be described.

Figure 8A:
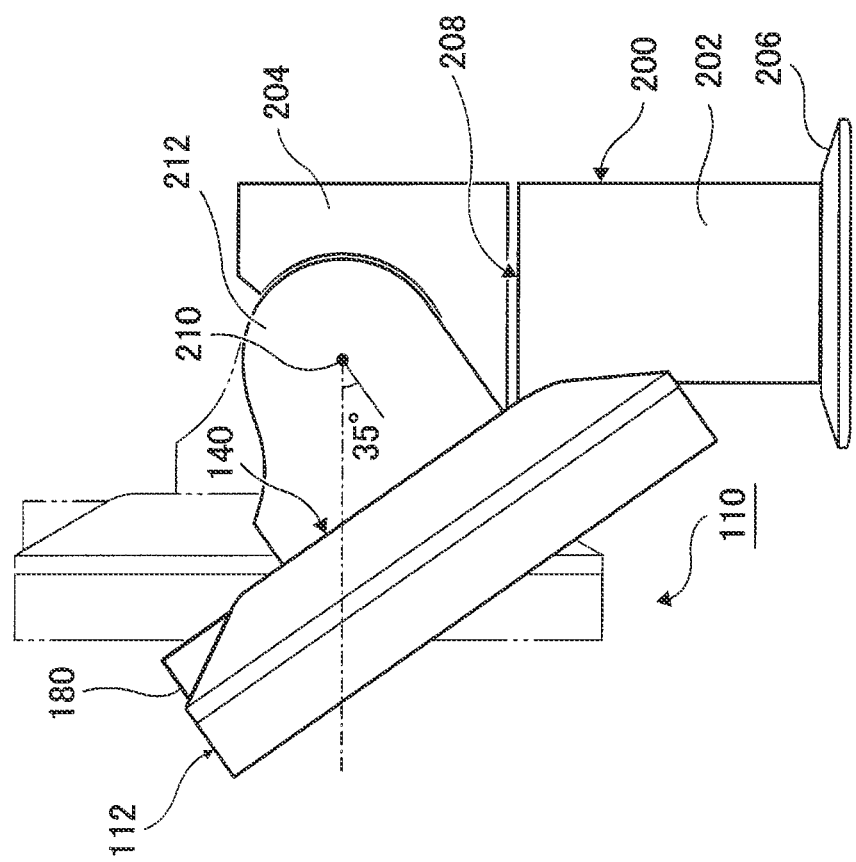
FIG. 8A is a side view showing a case where the operation display device according to the exemplary embodiment is rotated upward, as seen from one side.

First, when the operation display device 110 is moved upward around the second axis portion 210 of the columnar member 200, the front light emission portion 160 on the front face 114 side is moved upward and the rear light emission portion 180 on the rear face 116 side is moved downward, as shown in FIG. 8A. Incidentally, the angle range within which the operation display device 110 can be moved is about 10°.

Also in such a case, the user can identify light emission of the front light emission portion 160 from the front face 114 side of the operation display device 110, and can identify light emission of the rear light emission portion 180 from the rear face 116 side, the one side face 122 side and the other side face 124 side of the operation display device 110.

In addition, when the user sees the operation display device 110 from an oblique direction also in the case where the operation display device 110 faces upward, the user can see one of the front light emission portion 160 and the rear light emission portion 180 of the operation display device 110.

Figure 14A:
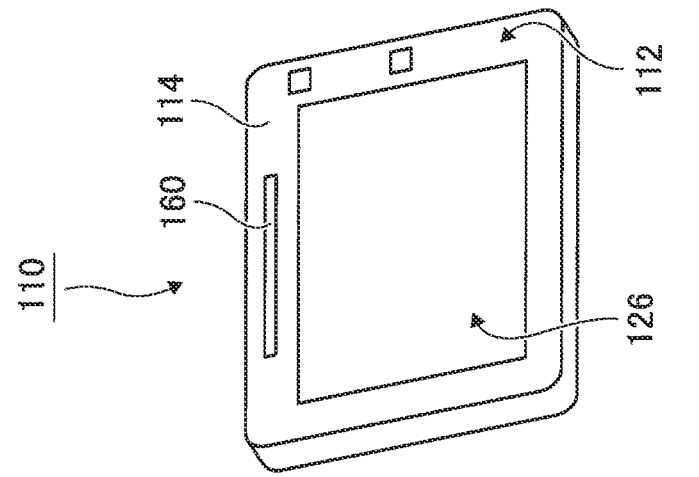
FIG. 14A is a front view showing a state in which the operation display device is rotated upward.
Figure 14B:
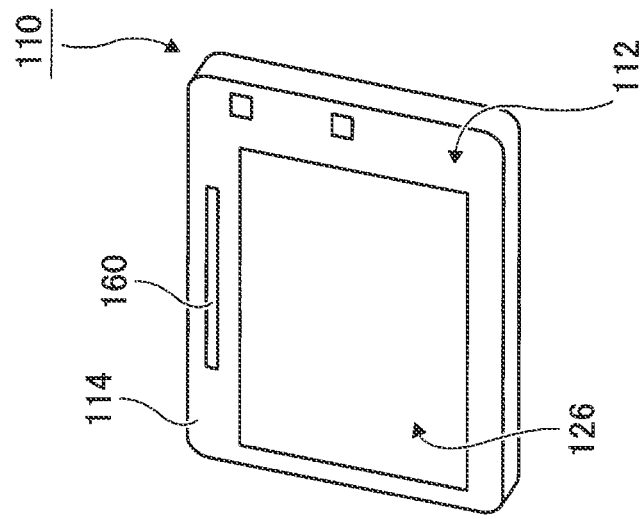
FIG. 14B is a front view showing a state in which the operation display device is rotated upward and leftward.
Figure 14C:
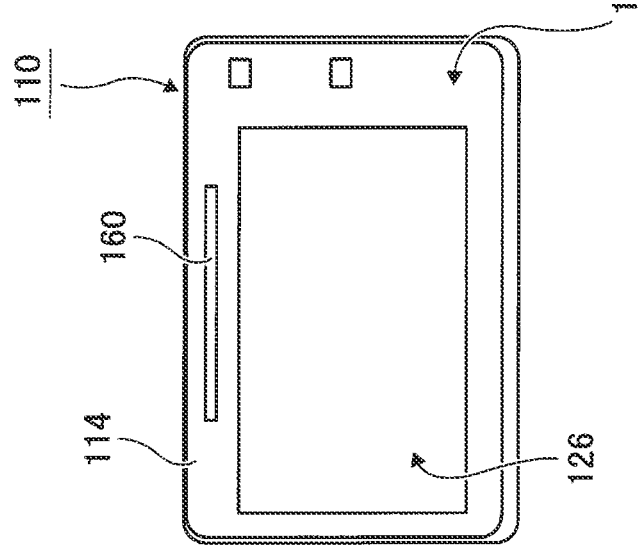
FIG. 14C is a front view showing a state in which the operation display device is rotated upward and rightward.

That is, in a state in which the user sees the operation display device 110 from the one side face 122 side, assume that the angle of the operation display device 110 is moved around the first axis portion 208 of the columnar member 200 so that the operation display device 110 can be gradually rotated in a direction in which the user can see the front face 114 side, as shown in FIGS. 14A to 14C. In this case, as the operation display device 100 turns the front face 114 side toward the user, the user cannot see the rear light emission portion 180 on the rear face 116 side the user could have seen from the one side face 122 side but the user can see the front light emission portion 160 on the front face 114 side. The same thing can be also applied to a case where the user sees the operation display device 110 from the other side face 124 side.

Figure 15A:
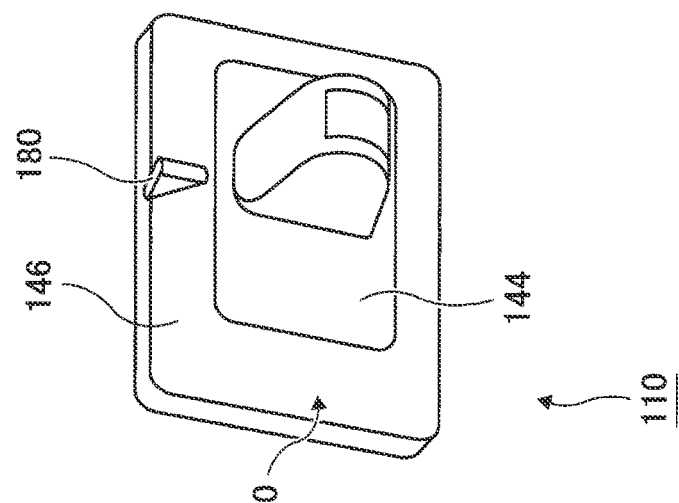
FIG. 15A is a rear view showing a state in which the operation display device is rotated upward.
Figure 15B:
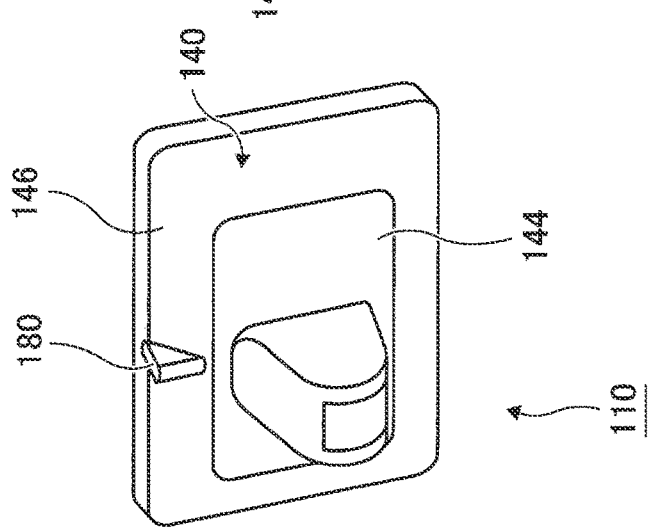
FIG. 15B is a rear view showing a state in which the operation display device is rotated upward and leftward.
Figure 15C:
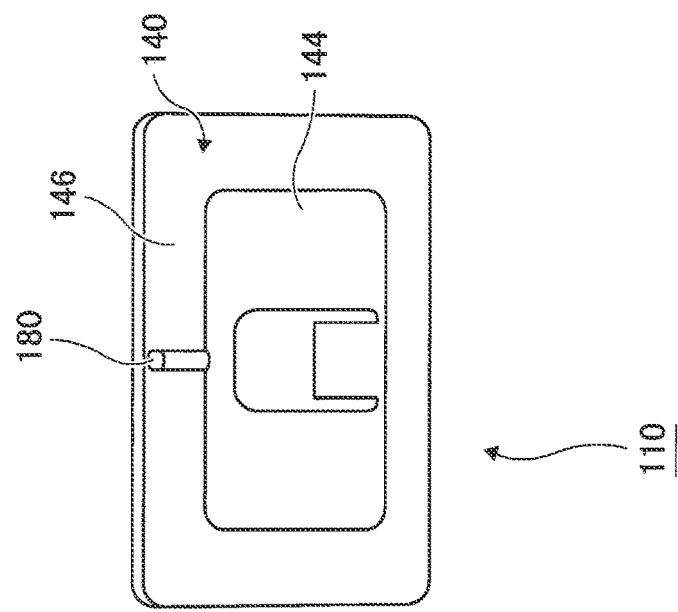
FIG. 15C is a rear view showing a state in which the operation display device is rotated upward and rightward.

In addition, in a state in which the user sees the operation display device 110 from the one side face 122 side, assume that the angle of the operation display device 110 is moved around the first axis portion 208 of the columnar member 200 so that the operation display device 110 can be gradually rotated in a direction in which the user can see the rear face 116, as shown in FIGS. 15A to 15C. In this case, as the operation display device 100 turns the rear face 116 toward the user, the user can continuously see the rear light emission portion 180 on the rear face 116 side the user could have seen from the one side face 122 side. The same thing can be also applied to a case where the user sees the operation display device 110 from the other side face 124 side.

In addition, when the operation display device 110 is moved within a range of 45° rightward and 45° leftward in a state in which the user sees the operation display device 110 from the front face 114 side, the user can always see the front light emission portion 160 on the front face 114 side (see FIG. 14B and FIG. 14C). Incidentally, the angle range within which the operation display device 110 can be moved in the left/right direction is set between 45° rightward and 45° leftward in the exemplary embodiment. However, even when the operation display device 110 is moved beyond the set angle range, the user can see the rear light emission portion 180 on the rear face 116 side before or substantially at the same time when the user cannot see the front light emission portion 160 on the front face 114 side.

Similarly, when the operation display device 110 is moved within a range of 45° rightward and 45° leftward in a state in which the user sees the operation display device 110 from the rear face 116 side, the user can always see the rear light emission portion 180 on the rear face 116 side (see FIG. 15B and FIG. 15C). Incidentally, the angle range within which the operation display device 110 can be moved in the left/right direction is set between 45° rightward and 45° leftward in the exemplary embodiment. However, even when the operation display device 110 is moved beyond the set angle range, the user can see the front light emission portion 160 on the front face 114 side before or substantially at the same time when the user cannot see the rear light emission portion 180 on the rear face 116 side.

In addition, when the angle of the operation display device 110 is moved in the left/right direction as described above, the user can identify the front light emission portion 160 or the rear light emission portion 180 of the operation display device 110 from a wide range. Even when the operation display device 110 is not moved but the position where the user sees the operation display device 110 is moved is changed, the user can see the operation display device 110 from various angles in the same manner as when the operation display device 110 is moved. Also in this case, the user can identify the front light emission portion 160 on the front face 114 side or the rear light emission portion 180 on the rear face 116 side in the same manner as in the case where the angle of the operation display device 110 is moved.

Figure 8B:
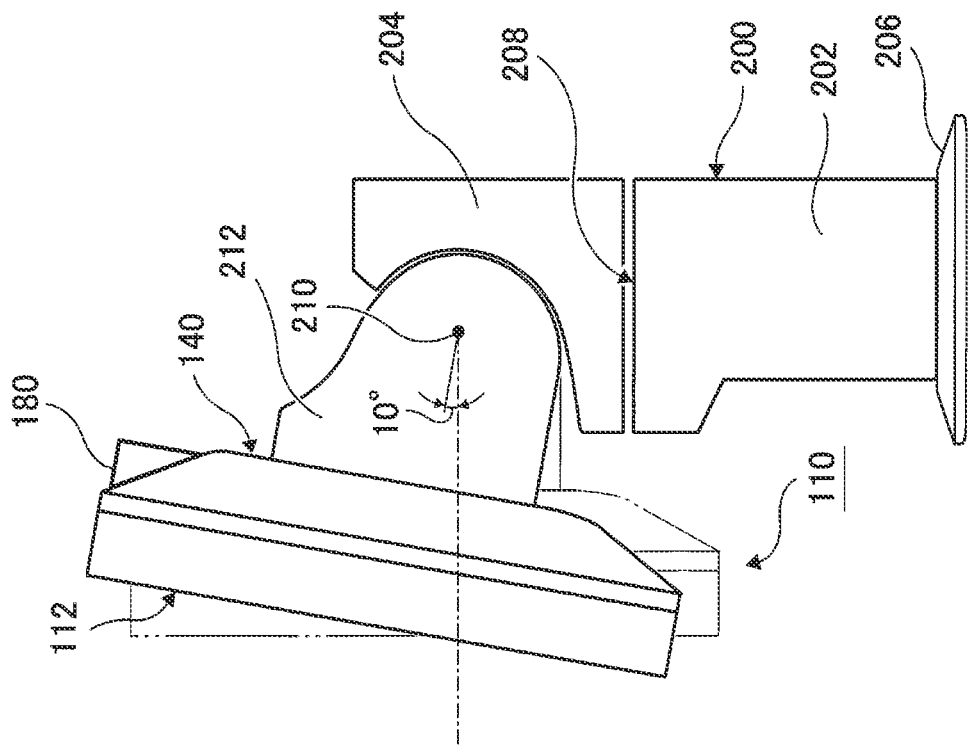
FIG. 8B is a side view showing a case where the operation display device is rotated downward.

Next, visual recognition of each of the light emission portions 160 and 180 in a case where the operation display device 110 is moved downward will be described. When the operation display device 110 is moved downward, the front light emission portion 160 on the front face 114 side is moved downward and the rear light emission portion 180 on the rear face 116 side is moved upward, as shown in FIG. 8B. Incidentally, the angle range within which the operation display device 110 can be moved is about 35°.

In such a case, the user can identify light emission of the front light emission portion 160 and the rear light emission portion 180 from the front face 114 side of the operation display device 110, and can identify light emission of the rear light emission portion 180 from the rear face 116 side, the one side face 122 side and the other side face 124 side of the operation display device 110.

On the other hand, when the user sees the operation display device 110 from an oblique direction also in the case where the operation display device 110 faces downward, the user can see one of the front light emission portion 160 and the rear light emission portion 180 of the operation display device 110.

Figure 16A:
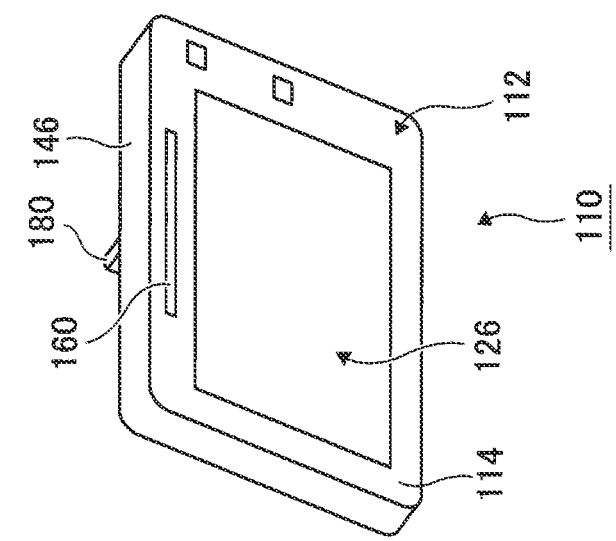
FIG. 16A is a front view showing a state in which the operation display device is rotated downward.
Figure 16B:
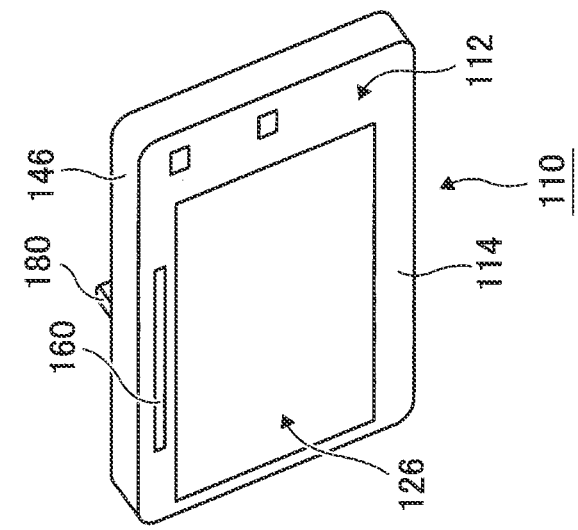
FIG. 16B is a front view showing a state in which the operation display device is rotated downward and leftward.
Figure 16C:
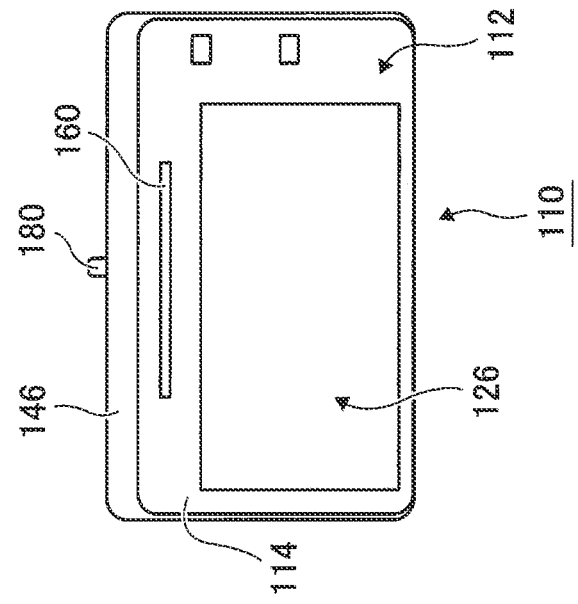
FIG. 16C is a front view showing a state in which the operation display device is rotated downward and rightward.

That is, in a state in which the user sees the operation display device 110 from the one side face 122 side, assume that the angle of the operation display device 110 is moved around the first axis portion 208 of the columnar member 200 so that the operation display device 110 can be gradually rotated in a direction in which the user can see the front face 114 side, as shown in FIGS. 16A to 16C. In this case, as the operation display device 110 turns the front face 114 side toward the user, the user can see the front light emission portion 160 on the front face 114 side together with the rear light emission portion 180 the user could have seen from the one side face 122 side. The same thing can be also applied to a case where the user sees the operation display device 110 from the other side face 124 side.

Figure 17C:
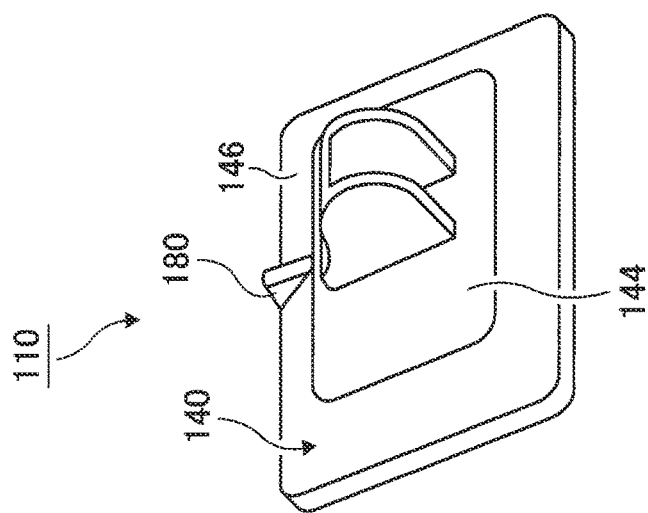
FIG. 17C is a rear view showing a state in which the operation display device is rotated downward and rightward.
Figure 17B:
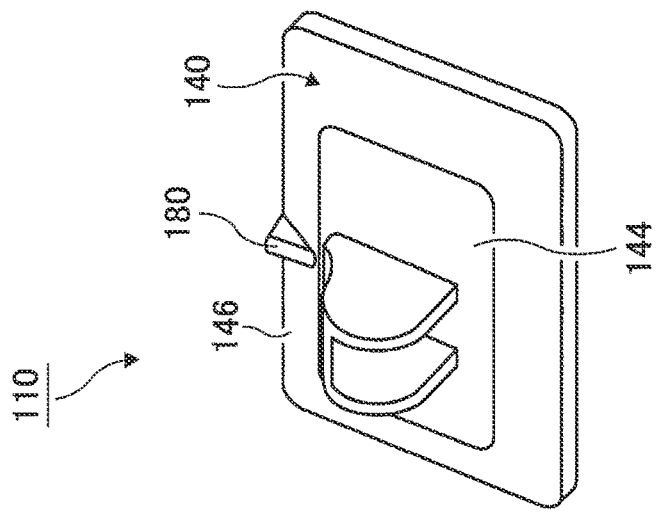
FIG. 17B is a rear view showing a state in which the operation display device is rotated downward and leftward.
Figure 17A:
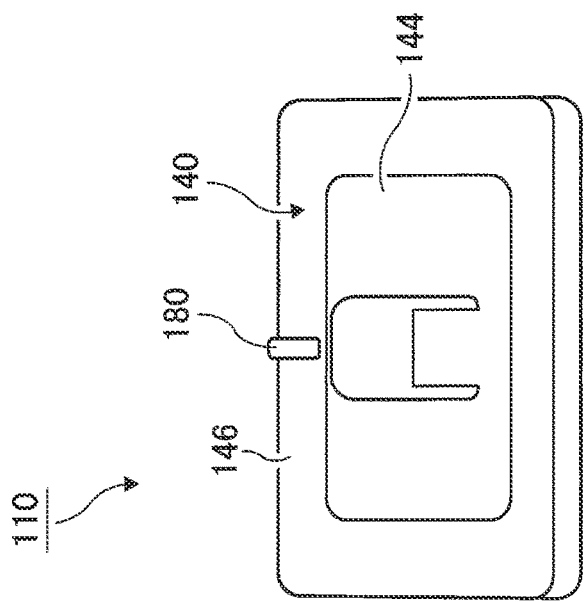
FIG. 17A is a rear view showing a state in which the operation display device is rotated downward.

In addition, in a state in which the user sees the operation display device 110 from the one side face 122 side, assume that the angle of the operation display device 110 is moved around the first axis portion 208 of the columnar member 200 so that the operation display device 110 can be gradually rotated in a direction in which the user can see the rear face 116, as shown in FIGS. 17A to 17C. In this case, as the operation display device 110 turns the rear face 116 toward the user, the user can continuously see the rear light emission portion 180 on the rear face 116 side the user could have seen from the one side face 122 side. The same thing can be also applied to a case where the user sees the operation display device 110 from the other side face 124 side.

In addition, when the operation display device 110 is moved within a range of 45° rightward and 45° leftward in a state in which the user sees the operation display device 110 from the front face 114 side, the user can always see the rear light emission portion 180 on the rear face 116 side together with the front light emission portion 160 on the front face 114 side (see FIG. 16B and FIG. 16C). Incidentally, the angle range within which the operation display device 110 can be moved in the left/right direction is set between 45° rightward and 45° leftward in the exemplary embodiment. However, even when the operation display device 110 is moved beyond the set angle range, the user cannot see the front light emission portion 160 on the front face 114 side but can see the rear light emission portion 180 on the rear face 116 side.

Similarly, when the operation display device 110 is moved within a range of 45° rightward and 45° leftward in a state in which the user sees the operation display device 110 from the rear face 116 side, the user can always see the rear light emission portion 180 on the rear face 116 side (see FIG. 17B and FIG. 17C). Incidentally, the angle range within which the operation display device 110 can be moved in the left/right direction is set between 45° rightward and 45° leftward in the exemplary embodiment. However, even when the operation display device 110 is moved beyond the set angle range, the user can see the front light emission portion 160 on the front face 114 side together with the rear light emission portion 180 on the rear face 116 side.

In addition, when the angle of the operation display device 110 is moved in the left/right direction as described above, the user can identify the front light emission portion 160 or the rear light emission portion 180 of the operation display device 110 from a wide range. Even when the operation display device 110 is not moved but the position where the user sees the operation display device 110 is changed, the user can see the operation display device 110 from various angles in the same manner as when the operation display device 110 is moved. Also in this case, the user can identify the front light emission portion 160 on the front face 114 side or the rear light emission portion 180 on the rear face 116 side in the same manner as in the case where the angle of the operation display device 110 is moved.

In addition, the angle with which the operation display device 110 has been moved can be also determined based on how the user can see the front light emission portion 160 and the rear light emission portion 180 of the operation display device 110.

Incidentally, the operation display device 110 is disposed in a highest position of the image forming apparatus 10 in order not to block the operation display device 110 from being visually recognized by the user in a state in which the operation display device 110 is provided on the mounting stand 106 of the image forming apparatus body 12. Thus, the user can identify the operation display device 110 easily. According to the configuration in the exemplary embodiment, the operation display device 110 is disposed in a higher position than the document reading device 100. However, the invention is not limited thereto. As long as the user can identify the operation display device 110, the operation display device 110 may be disposed so that at least the front light emission portion 160 and the rear light emission portion 180 can be disposed in higher positions than the document reading device 100. In addition, the operation display device 110 may be mounted directly on the image forming apparatus body 12 without providing the mounting stand 106.

In addition, the case where the operation display device 110 is provided on the mounting stand 106 protruding from the image forming apparatus body 12 has been described in the exemplary embodiment. However, the invention is not limited thereto. The operation display device 110 may be mounted directly on the image forming apparatus body 12. Incidentally, when the document reading device 100 is not provided in the image forming apparatus 10, the operation display device 110 can be provided on the upper portion of the image forming apparatus body 12.

The case where the front light emission portion 160 and the rear light emission portion 180 are provided on the front face 114 side and the rear face 116 side of the operation display device body 112 of the operation display device 110 respectively has been described in the exemplary embodiment. However, light emission of the front face 114 may be performed by the screen 128 of the operation display 126 and the rear light emission portion 180 may be provided only on the rear face 116 side.

The foregoing description of the embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention defined by the following claims and their equivalents.

What is claimed is:

1. An operation display device comprising:
   an operation display device body;
   a covering member; and
   a rear light emission portion, the operation display device body comprising a touch panel provided in one face of the operation display device body, the covering member covering an opposite side of the operation display device body to the touch panel, the rear light emission portion being provided on an upper part within an opposite face of the operation display device body, the opposite face being a face of the operation display device body that is located opposite to the one face of the operation display device body where the touch panel is provided, the rear light emission portion being protruded from the covering member and being disposed in a position that does not extend beyond an upper face of the operation display device body.

2. The operation display device according to claim 1, wherein the rear light emission portion is protruded like a triangle from the covering member.

3. The operation display device according to claim 2, wherein the covering member is slanted.

4. The operation display device according to claim 1, wherein the rear light emission portion is substantially parallel with the upper face of the operation display device body.

5. The operation display device according to claim 1, wherein the rear light emission portion is substantially parallel with a rear face of the operation display device body.

6. The operation display device according to claim 1, wherein the rear light emission portion comprises a plurality of light emission portions which are different from each other.

7. An apparatus comprising:
the operation display device according to claim 1; and
an another device to be operated by the operation display device,
wherein the rear light emission portion is configured to emit light in accordance with a state of the another device.

* * * * *